Dec. 29, 1964   J. E. CROWE ETAL   3,163,087
MACHINE TOOL CONTROL SYSTEM
Filed Dec. 7, 1959   7 Sheets-Sheet 1

INVENTORS
John E. Crowe, John G. Osburn
Richard E. Stobbe, George R. A. Weber
Frank Zankl
BY
Attorney Dec. 29, 1964
J. E. CROWE ETAL
3,163,087
MACHINE TOOL CONTROL SYSTEM
Filed Dec. 7, 1959
7 Sheets-Sheet 2
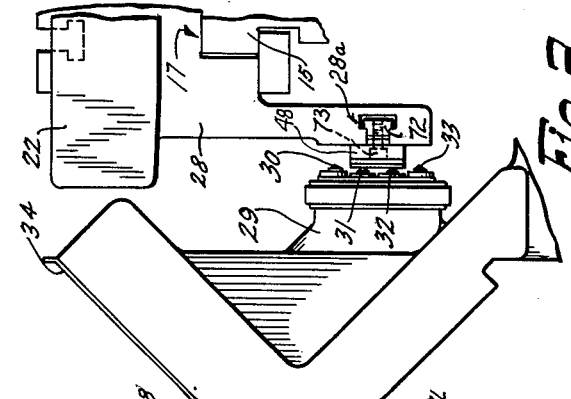
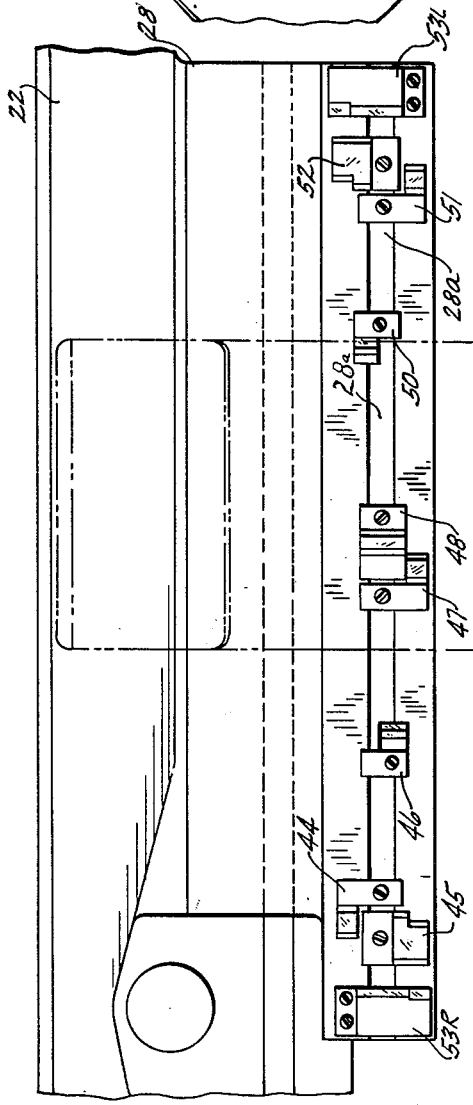
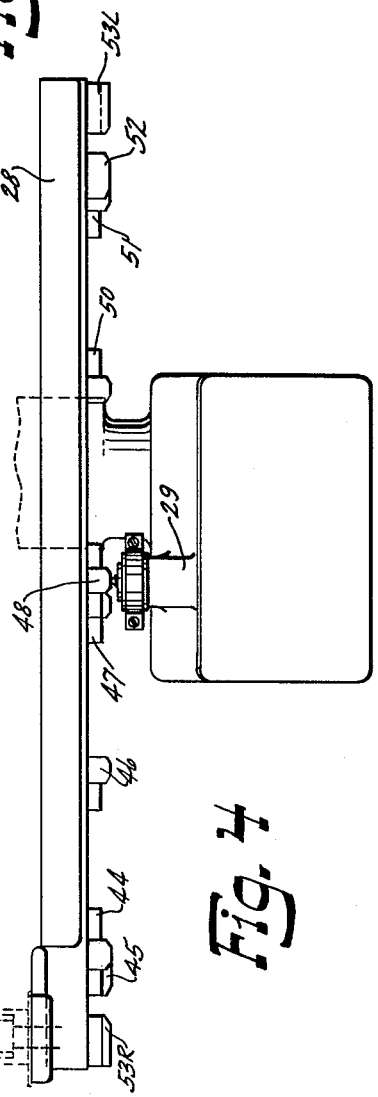
INVENTORS
John E. Crowe, John G. Osburn
Richard E. Stobbe, George R. F. Weber
Frank Zankl
BY *Ewry J. Wutschel*
Attorney

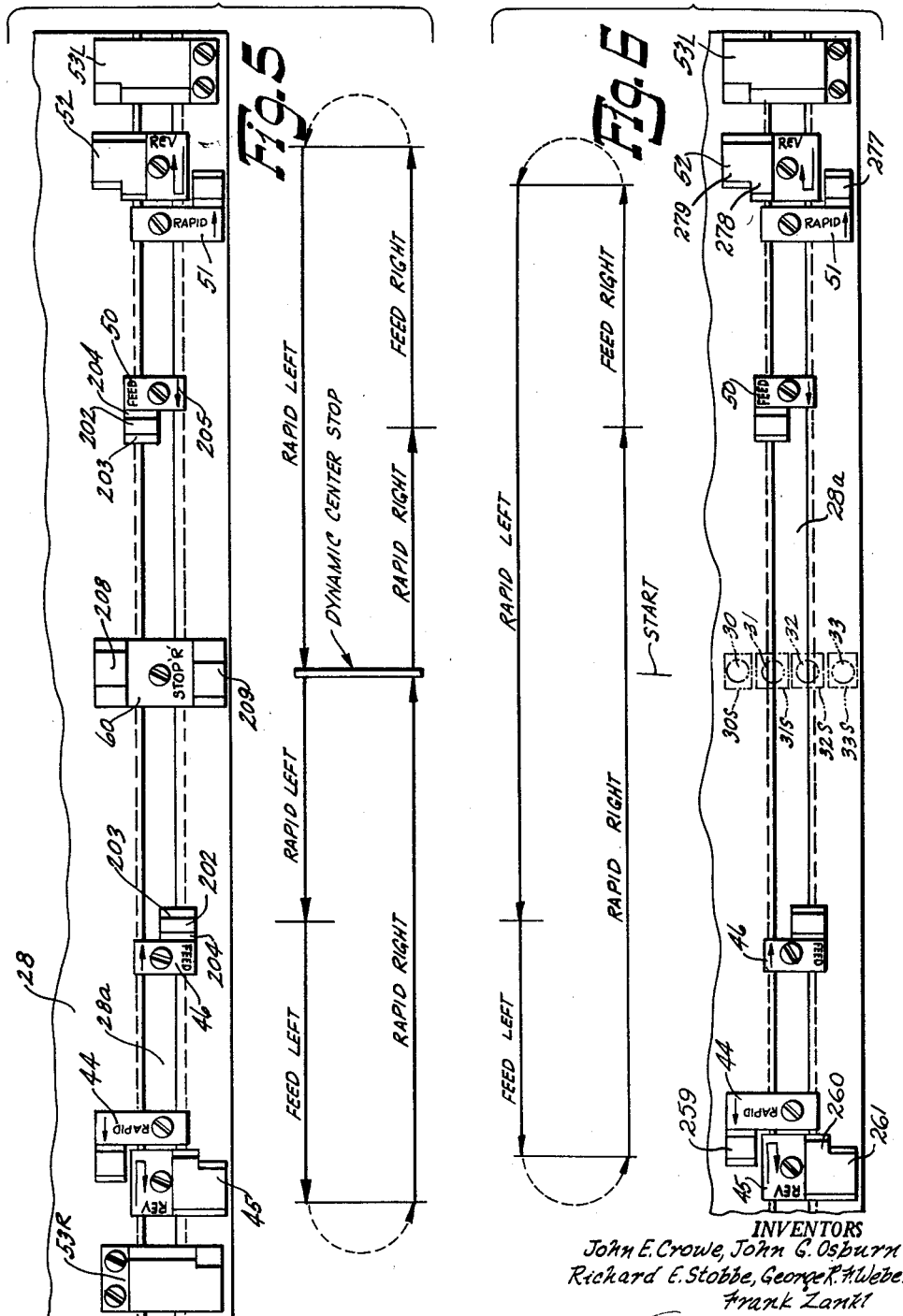

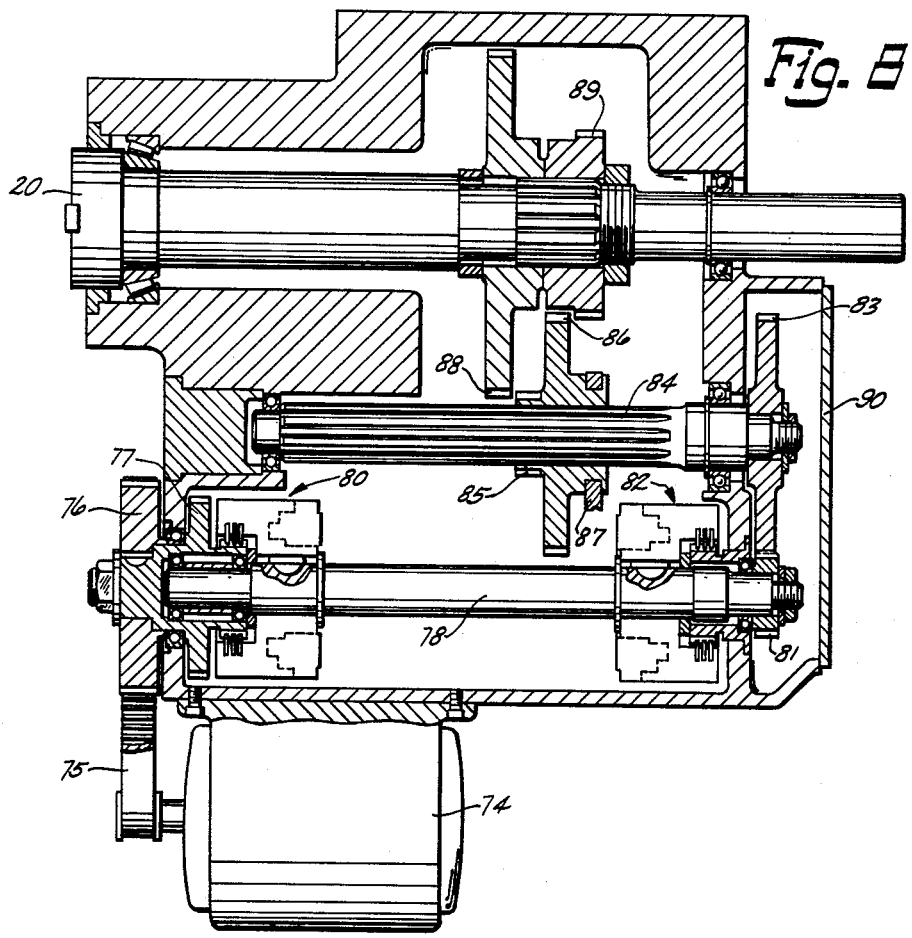

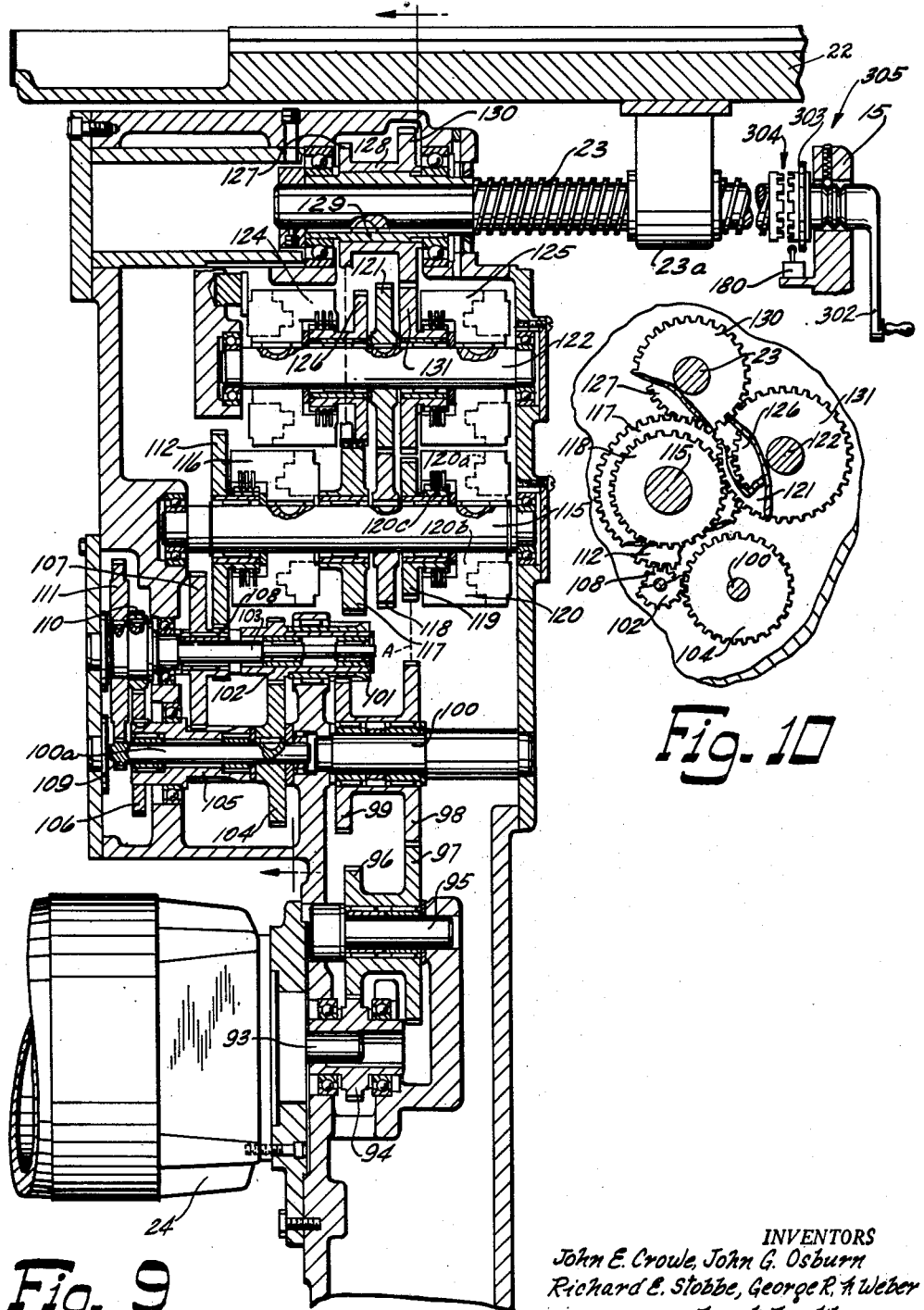

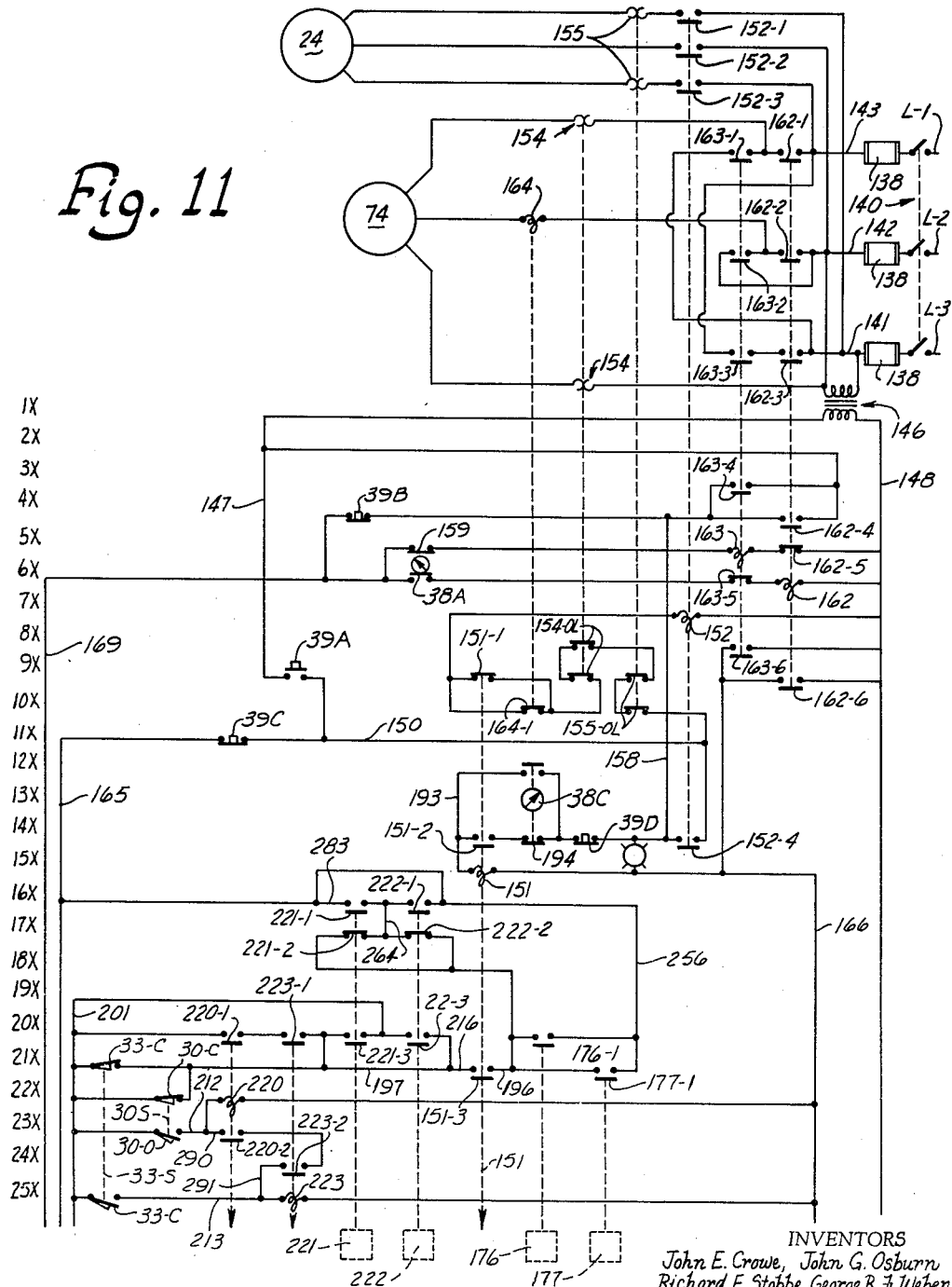

United States Patent Office 3,163,087
Patented Dec. 29, 1964

3,163,087
MACHINE TOOL CONTROL SYSTEM
John E. Crowe and John G. Osburn, Milwaukee, Richard E. Stobbe, West Allis, and George R. F. Weber and Frank Zankl, Milwaukee, Wis., assignors to Kearney & Trecker Corporation, West Allis, Wis., a corporation of Wisconsin
Filed Dec. 7, 1959, Ser. No. 857,767
21 Claims. (Cl. 90—21)

This invention relates to improvements in milling machines to be operated automatically but subject at all times to manual control and in control systems for such operation, but in which the automatic control system does not hamper manual operation of the machine. The area of automatic operation relates to automatic cycling control of worktable movement relative to rotation of the cutter, i.e. the worktable can be cycled continuously, either through the complete allowable range of movement, or intermittently to accomplish split cycle milling in which milling operations are performed alternately on workpieces secured to opposite ends of the table.

The present structure and control secures a number of advantages both in automatic and manual operation of the machine and when automatic operation must be interrupted to allow some intervening manual operations. A smaller number of dogs is required than heretofore and the smaller number of dogs controls a greater number of operations than heretofore with the usual number of dogs. The table can be safely cranked manually to different positions regardless of the setting of the dogs or of the setting of the electrical control system for automatic operation and without mechanical interlocks between the cranking means and the automatic control system. Various interlocks are provided so that other manual operations such as changing gears to determine speed of the spindle or the rate of table movement, can be performed without danger that the machine will commence to operate in automatic cycling. The table can be stopped at any time and moved back into the cutting range under power rather than manually cranking it back into such range. Automatic rapid traversal of the table can be manually and quickly changed to feed rate movement of the table. The control system is so energized that overlapping of clutch energization is obtained which insures precisely starting and stopping of both feed and rapid traversal table movements in any cycle of automatic operations. The clutches controlling the direction of table movement act in opposite directions when changing from the feed rate to rapid traversal and vice versa. Other advantages are specifically mentioned or will be apparent from the description of the operation.

FIG. 2 is a fragmentary view partially in elevation and partially in section, of the movable table and of a stationary trip post bearing electric switches and which is related to the table;

FIG. 3 is a front view of the table with the trip post superposed on the table and showing one setting of dogs on the table for a particular cycle of automatic machine operations;

FIG. 4 is a fragmentary plan view of the table and its dogs and the trip post with its switches as shown in FIGS. 2 and 3;

FIG. 5 is a fragment of the table showing the dogs controlling table movement for one illustrative cycle of automatic operation and showing the marking on the dogs themselves and includes a diagram showing the movements of the table obtained from the setting of the dogs shown;

FIG. 6 is a view similar to FIG. 5 and showing the dog setting for another cycle of automatic machine operation and includes a diagram of table movement for the cycle of operations obtained from the dog setting of structural view;

FIG. 7 is a chart showing the switches actuated by the table as the trip post switches coact with various dogs;

FIG. 8 illustrates the drive for the machine spindle on which a cutter is to be mounted;

FIG. 9 is a developed view of the drive for the table;

FIG. 10 is an end view of portion of the table drive shown in FIG. 11 and illustrating the relationships in space of some of the shafts and gears thereof; and FIGS. 11 and 11A are diagrams of the electrical connections for supplying power to the several drives, and of the control circuits for such drives, and particularly for the table drive.

Figure 1:
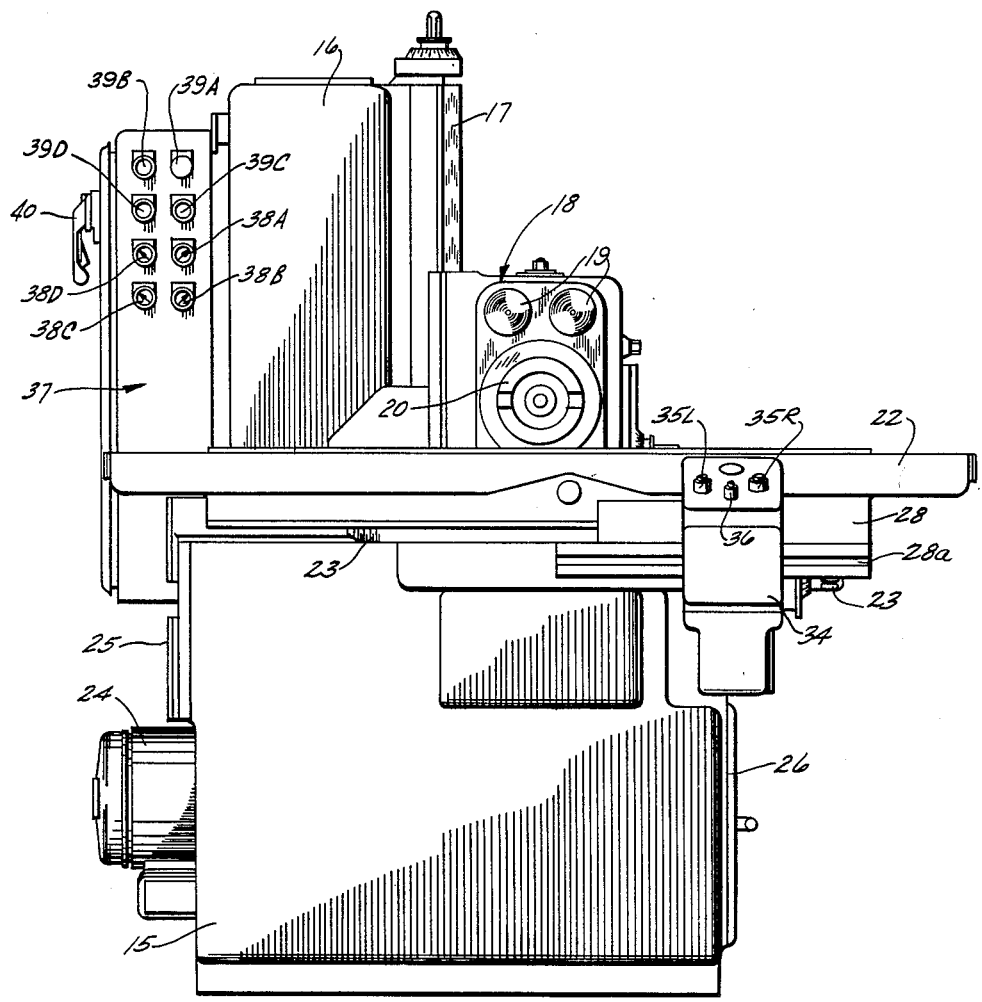
FIG. 1 is a general view in front elevation of a milling and boring machine embodying the present invention.

Referring specifically to the drawing, the machine comprises a hollow base 15 on which are mounted other parts and in which other parts are housed. A hollow column 16 rises vertically from the base and has mounted thereon ways 17 on which a spindle head 18 is movable vertically, the spindle head including over-arms 19 in overlying relationship to a spindle 20 on which a cutter is to be mounted. The spindle drive is mounted in and on the column 16.

Adjacent the column 16 and extending along an upper surface of the base, the usual way structure (see FIG. 3) is provided for reciprocation of a table 22 on which a workpiece is to be carried. Table 22 is reciprocated by a rotatable screw 23 acting through a nut 23a (see FIG. 9) fastened to the underside of the table 22 in well-known manner; and the screw is likewise selectively connectable to be driven by a motor 24 through gearing to be described, such gearing being accessible through doors 25 and 26 in the sides of the base. Alternatively, the screw 23 is connected with well known means for applying a crank by which the screw may be manually turned to move table 22 in either diretcion. A forward depending table portion or plate 28 is formed with a T-slot 28a for receiving a plurality of cycle control dogs (see FIGS. 3–6) for effecting automatic control of the movement. A post 29 (see FIG. 2) extends from the base 15 and carries a plurality of dog-actuated switch plungers 30–33 to provide coded actuation of the automatic control system. Integrally formed with the post 29 is a box 34 presenting a forwardly inclined face having a plurality of manually actuatable push-buttons 35L, 35R and 36 for effecting manual control of table movements. On the column 16 is placed a control box 37 in which are mounted various elements of the electrical control circuit to be described and which supports rotary switches 38A, 38B, 38C, 38D and push-buttons 39A, 39B, 39C, and 39D, all forming a part of the control circuit. The handle of a main disconnect switch 40 extends from the control box.

Various forms and combinations of dogs are used as shown and the dogs may be arranged in any different combinations in the T-slot 28a of the plate 28 as illustrated in FIGS. 3, 5 and 6. In each combination and location a dog or combination of dogs co-acts with the coded post switch plungers to perform different functions and all the dogs illustrated are given different numerals even though the configuration of a number of dogs is identical. Thus, in FIG. 3 dogs 46 and 50 and dogs 44, 47 and 51 are identical while dogs 48 and 52 differ from the other dogs in the structure. It will be noted that dogs 46 and 50 and dogs 44 and 47 are in oposing positions and accordingly actuate different switch plungers. Safety limit stops 53L and 53R at each end of the plate slot 28a prevent table-overtravel in either direction. FIG. 5 shows a different arrangement of dogs 44–52 and it will be seen that dog 60 differs in configuration from all of the preceding dogs. The dogs 44–52 in FIG. 6 are severally identical with one or another of the dogs in FIGS. 3 and 5 but are arranged to provide for a relatively simple cycle of operations which will be explained in detail. It will be noted that the dogs in FIGS. 5 and 6 are marked to indicate the functions they initiate in coaction with one or more of the switches operated by the trip post pushbuttons, and to indicate the direction of travel upon such coaction.

The spindle 20 is driven by a motor 74 through gearing which may be changed to produce a high range and a low range of spindle speeds. The motor 74 is connected by a cogged belt 75 to a sprocket 76 on the hub of a gear 77 rotatably supported on and rotatably supporting one end of a shaft 78. An electro-magnetic clutch 80 is fixed on the shaft 78 for engaging the gear 77 to the shaft 78 for driving a pinion 81 mounted at the other end of such shaft. An electro-magnetic brake 82 is mounted on the shaft 78 adjacent the pinion 81 for quickly interrupting rotation of the spindle. The pinion 81 engages a gear 83 on a splined shaft 84 on which a cluster gear 85, 86 is shiftable by the usual fork and lever arrangement indicated at 87. Thus gear teeth 85, 86 may be respectively engaged with a gear 88, or a gear 89, both of which are fixed on the spindle 20. When gears 85 and 88 are engaged a relatively low speed is transmitted while engagement of gears 86 and 89 transmits a relatively high speed to the spindle. A door 90 gives access to the gear 81, 83 which are so placed on the respective shafts as to be readily exchangeable whereby different speeds are obtainable within both high and low speed ranges.

Referring now to the drive for the table as shown in FIGS. 9 and 10, shaft 93 of the table drive motor 24 has a pinion 94 mounted thereon which rotates in clockwise direction. A first axle 95 rotatably carries a gear 96 which is driven counterclockwise by pinion 94 and which has another set of teeth 97 meshing with teeth 98 of a double gear having a second set of teeth 99, the double gear 98, 99 being rotatably mounted on a first shaft 100.

Gear teeth 98 mesh with another gear to be described and as is indicated by dotted line A, while gear teeth 99 mesh with the teeth 101 of a gear cluster having a second set of teeth 102 and rotatably mounted on a second shaft 103. The gear teeth 102 mesh with a gear 104 keyed on a shaft 100a and such shaft rotatably supports a gear cluster having two sets of teeth 105 and 106. Gear teeth 105 mesh with the teeth 107 of a gear cluster on the second shaft 103 and such cluster has a second set of teeth 108. Gear 106 and a gear 109 formed integrally on the shaft 100a mesh respectively with gears 110 and 111 on the second shaft 103. The gears 109 and 111 are readily exchangeable and provide means whereby the speed of table movement may be varied. Gear 108 on the second shaft 103 meshes with a gear 112 rotatable on a rate change shaft 115 unless it is clutched to the shaft by an electro-magnetic clutch 116. The gearing described up to this point is involved only in the transmission of power to the screw and when the table is to be moved at a speed for feeding the workpiece to the cutter. Hence, clutch 116 will be hereinafter called the feed clutch.

The shaft 115 rotatably supports an idler gear 117, a gear 118 keyed on the shaft, and rotatably supports a gear 119 driven by gear 98, and which is engageable with the shaft by an electro-magnetic clutch 120. The clutch 120 is used when the table is to be rapidly traversed from one position to another and will be hereinafter called the rapid traverse clutch. It will be noted that the feed input gear 112 is normally rotating in a clockwise direction and that the rapid traverse input gear 119 is normally rotating in a counterclockwise direction. Due to the reverse rotation of gears 112 and 119 respectively, selective engagement of feed clutch 116 or rapid traverse clutch 120 effects not only a change in the rate of rotation of shaft 115, but also a change in the direction of rotation. Thus, engagement of clutch 116 effects clockwise rotation of shaft 115, and engagement of clutch 120 (whenever clutch 116 is disengaged) effects counterclockwise rotation of shaft 115. Therefore, although feed clutch 116 and rapid traverse clutch 120 are considered primarily as rate change clutches, they function also as directional clutches in coordinated relationship with the primary directional clutches to be hereinafter described.

From the rate change shaft 115, power is transmitted via the gear 118 keyed thereto which meshingly engages a directional gear 121 keyed directly to the central portion of a rotatably journalled, primary directional shaft 122. It will be apparent that whenever gear 118 is rotating in a clockwise direction at a feed rate, the primary directional shaft 122 will be rotated in a counterclockwise direction. In a similar manner, whenever gear 118 is being driven in a counterclockwise direction at a rapid traverse rate, the primary directional shaft 122 will be rotated at a rapid rate in a clockwise direction. Irrespective of the direction of rotation of the primary directional shaft 122, power is transmitted to move the table 22 in a selected direction at the required rate, by means of a pair of electro-magnetic primary directional clutches 124 and 125, having their driving output members respectively keyed to the opposite ends of shaft 122. Actuation of clutch 124 effects a transmission of power from primary directional shaft 122 by engagement of cooperating clutch plates to drive a gear 126, that is normally rotatably carried on a central intermediate portion of the shaft. The gear 126 engages the idler gear 117 which directly engages a gear 127 carried by a couplet 128 that is in turn keyed to a tubular drive sleeve 129 rotatably journalled in the upper central portion of the frame. Inasmuch as the sleeve 129 is keyed to the leftward end of the screw 23, power is transmitted from the couplet 128 for driving the screw 23 for effecting selective longitudinal movement of the nut 23a and table relative to the supporting frame.

The couplet 128 is provided with a rightwardly spaced gear 130 which is in direct meshing engagement with a driving gear 131 journalled about the central portion of the directional shaft 122. Thus, whenever clutch 124 is disengaged the flow of power from shaft 122 to the gear 126 is interrupted and the clutch 125 may be actuated for connecting the shaft 122 to drive the gear 131 as well as the cooperatively intermeshing couplet gear 130.

Prior to effecting movement of the table in either direction, it will now be assumed that the machine has been activated, i.e. motor 24 is energized to drive the feed output gear 112 in a clockwise direction and the rapid traverse output gear 119 in a counterclockwise direction. At the same time, the feed drive clutch 116 and the rapid traverse drive clutch 120 are both deenergized in a manner that neither the gear 112 or the gear 119 is clutch connected to drive the rate change shaft 115. Thus, the rate change shaft 115 is retained in stationary, nonrotating condition by means of the interengagement of the gear 118 with the gear 121 keyed to the directional shaft 122 which is positively and dynamically restrained against rotation in either direction. With these conditions existing, both of the primary directional clutches 124 and 125 are energized, thereby positively clutching the gears 126 and 131 to the shaft 122. This arrangement prevents movement of the table in either direction and provides a positive dynamic braking action to prevent rotation of the screw 23 in either direction. At this time, therefore, the dynamic brake connection extends from the gear 127 via the gear 117, gear 126, engaged clutch 124, directional shaft 122, engaged clutch 125, and gear 131, connected to the gear 130. Whenever this condition is effected upon energization of both directional clutches 124 and 125, it will be apparent that the driven gear couplet 128, as well as the table screw 23, are positively braked against rotational movement in either direction, thereby effecting a positive lock for preventing a longitudinal movement of the worktable 22 in either direction.

As hereinbefore explained, with the machine dynamically activated for operation, both of the directional clutches 124 and 125 are engaged, and both of the rate change clutches 116 and 120 are disengaged. In general terms, longitudinal movement of the worktable in a selected direction is initiated by disengaging one or another of the directional clutches 124, 125 and, at the same time, engaging one or another of the rate change clutches 116 and 120. It will be apparent that due to the reversed rotation of the shaft 115 at the moment of changing from feed to rapid traverse, or vice versa, it will be necessary to effect disengagement of the then operatively engaged directional clutch, at that particular moment, and engagement of the then disengaged directional clutch, even though table movement is to be continued in the same direction. To clarify the coordinated mode of operation of the four table control clutches 116, 120, 124 and 125, it is deemed advantageous to describe the specific clutches which are engaged for effecting the required rate and directional control of the worktable.

To more clearly illustrate the novel operation and greatly improved result of this particular aspect of the applicants' invention, the following specific operating examples illustrate the dynamic interrelationship of the four table control clutches:

(1) Assume the machine is electrically activated with the rate change clutches 116, 120 de-energized and the directional clutches 124, 125 both energized to effect the dynamic braking action. With this condition existing, the table is to be moved to the right initially at feed rate, the rate of movement is to be changed to a rapid rate during table movement, and then dynamically braked to a stop. To achieve this result, the directional clutch 125 is de-energized, and simultaneously therewith, the feed directional clutch 116 is energized to effect transmission of power from the feed input gear 112 to the directional shaft 115. The transmission of power from shaft 115 to effect table right movement at feed rate is then transmitted via the engaged directional clutch 124 for rotating the screw 23 in the required direction. To effect a change from a feed to a rapid rate, feed clutch 116 and directional clutch 124 are both disengaged, and, simultaneously therewith, rapid rate clutch 120 and directional clutch 125 are activated to engaged condition. As this occurs, due to the comitant reversal in direction of the shaft 115, as the rate is changed, an instantaneous, momentary braking effect is produced upon the primary directional shaft 122. Although the intermediate braking effect upon shaft 122 is only momentary, it is sufficient to insure an immediate, change in rate from the feed to rapid movement at the precise instant this change is called for by an appropriate setting of the table trip dogs and coded, cooperating table control switches hereinbefore described. Conversely, a change from rapid to feed rate can be precisely controlled due likewise to the intermediate, momentary braking effect produced upon the primary directional shaft 122, as the direction and rate of rotation of rate change shaft 115 is changed. With the table moving in a rightward direction at rapid rate, a positive stop is achieve by re-engaging the dynamic table brake, which is effected by simultaneously disengaging the rapid traverse clutch 120 and re-engaging directional clutch 124, the latter cooperating with the already engaged clutch 125 to immediately stop table movement.

(2) It will now be assumed that the machine is electrically activated, and the table is to be moved in a leftward direction, the rate increased to rapid, and the table stopped. To achieve this result, the feed clutch 116 is engaged and simultaneously therewith directional clutch 124 is disengaged. Thereupon, power is initially transmited from gear 112 via clutch 116 and clutch 125 to effect leftward feed movement of the worktable. Changing from a leftward feed to a leftward rapid rate is effected by disengaging clutches 116, 125 and simultaneously engaging clutches 120 and 124. Dynamic braking action is achieved as hereinbefore explained by disengaging the rapid traverse clutch 120 and re-engaging clutch 125 which cooperates with the already engaged clutch 124 to produce the dynamic braking action.

(3) With the clutches 116 and 125 engaged to effect leftward table movement at feed rate, reversal to a rapid right direction rate is accomplished by deenergizing clutch 116 and simultaneously therewith engaging clutch 120.

(4) In similar manner, with the clutches 116 and 125 engaged to effect feed left, the table can be reversed to a feed right direction by de-energizing clutch 125 and energizing clutch 124.

(5) Whenever the table is moving rightwardly at feed right, clutches 116 and 124 are engaged. To effect reversal from feed right to rapid left, feed clutch 116 is disengaged and clutch 120 is engaged.

(6) From the foregoing it will be apparent that a change in direction from feed right to feed left, requires simply a disengagement of clutch 124 and engagement of clutch 125, with the feed rate clutch 116 remaining engaged.

Figure 11A:
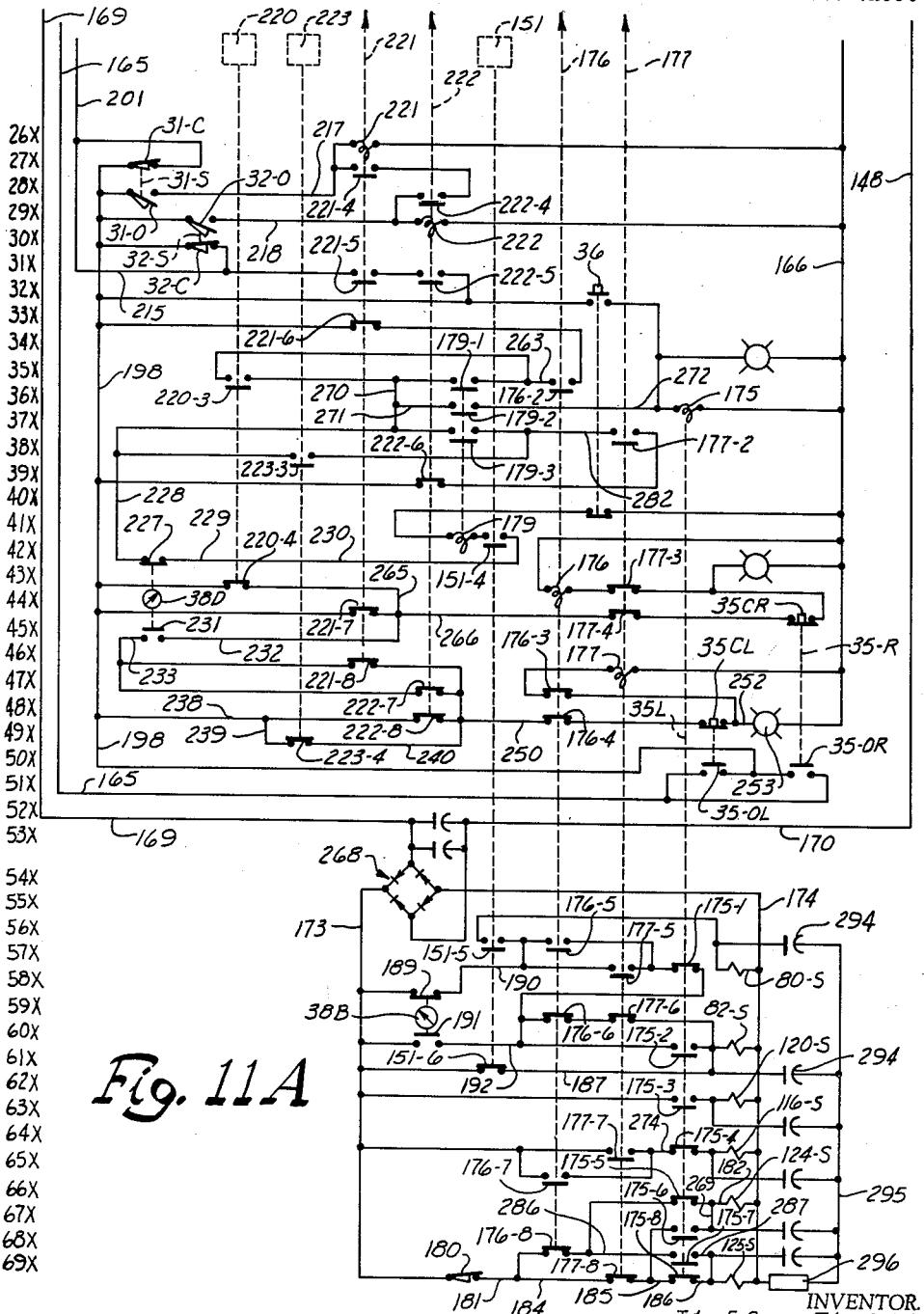

The control circuit for effecting energization of the feed motor 24 and spindle motor 74 as well as for activating the automatic control circuit and associated electromagnetic clutches is fully illustrated in FIGS. 11 and 11A. As there shown, the electrical current derived from three phase supply conductors $L_1$, $L_2$ and $L_3$ is transmitted via the usual disconnect switch 140 via fuses 138 to energize conductors 141, 142 and 143. Conductors 141 and 142 are connected via a transformer 146 to supply current of reduced voltage to energize control circuit conductors 147 and 148. For simplicity in reading the circuit diagram, and for locating particular components, horizontal lines are designated by a vertical column of figures to the left of the diagram comprising a key extending from numbers 1X to 69X inclusive. For further clarity in reading the diagram, certain of the vertical lines in the control circuit, as well as certain portions of horizontal lines, are designated by a separate reference numeral to show specific inter-connections between associated conductors and control components. Relay contact bars are indicated by a hyphenated number comprising a relay number followed by a digit. For example, reading rightward from the key number 17X of the vertical key is a normally closed contact 221-2. This contact is actuated to open position by energization of a relay coil 221 located by reading rightwardly from the number 26X of the vertical key.

To start the motors and activate the control circuit for operating the machine, a master start button switch 39A, line 9X, is momentarily depressed. Momentary closure of start button switch 39A completes a circuit from control conductor 147 via conductor 150 and thence through normally closed contact bars 155–OL and 154–OL associated with overload control relays 155 and 154 respectively. The circuit then continues via normally closed contact 151–1 associated with spindle control relay 151, found in line 15X, to one terminal of coil 152 operative to energize the feed motor 24. From coil 152, the circuit continues through a horizontal conductor line 7X, connected to the opposite terminal thereof and to energized control supply conductor 148. During machine operation, in the event an overload should occur on either the spindle motor 74 or feed motor 24, coils 154 and 155 in the power supply conductors thereto are activated to effect de-energization of the spindle motor and the feed motor.

Upon energization of feed motor relay 152 to closed position, contacts bars 152–1, 152–2 and 152–3, shown in the power supply circuit, are moved to closed position completing a circuit from supply conductors 141, 142 and 143 to effect energization of the feed motor 24. Simultaneously with the movement of contact bars 152–1, 152–2 and 152–3 to closed position, another contact bar 152–4 at 14X, is moved to closed position completing a circuit from conductor 150 to vertical conductor 158. Thereupon, inasmuch as starting of the feed motor 24 is practically instantaneous upon depressing switch 39A, a circuit is completed from control conductor 147, momentarily closed master start button switch 39A, conductor 150, and vertical conductor 158 to horizontal line 4X. A spindle motor starting circuit continues from conductor 158, via normally closed master stop button switch 39B, and thence along horizontal line 4X via closed contact bar 159 associated with rotatable spindle direction selector switch 38A, and thence via normally closed contact bar 162–5, line 5X, associated with spindle right motor control relay 162, found in line 6X. From the closed contact 162–5, the energized circuit continues to the control conductor 148.

Energization of the spindle left relay coil 163 effects immediate closure of associated contact bars 163–1, 163–2, and 163–3 to transmit power from energized power supply conductors 141, 142 and 143 to effect energization of the spindle motor 74. Retention of the spindle left coil 163 in energized condition completes a seal-in circuit via the contact bar 163–4, which is moved to closed position for connecting the energized starting circuits to control conductor 147 upon release of master start switch 39A. It will be noted that the seal-in circuit for the feed motor starting relay 152 extends via normally closed contact bars 155–OL, and thence via closed contact bar 152–4 to vertical conductor 158, and through closed contact bar 163–4 to line 147.

In the event the normally closed contact bar 151–1 in line 9X is energized to open position, a shunt circuit is provided by normally closed contact 164–1 associated with instantaneous overload relay 164 interconnected in one of the power supply conductors to the spindle motor 74. The shunt control feed motor starting circuit via normally closed contact 164–4 is utilized only when restarting the feed motor by momentarily depressing the master start push button switch 39A after the spindle motor 74 has already been energized to rotate. This condition would occur, for example, in the event the feed motor relay 152, line 7X, was de-energized in response to a normal overload condition upon either the feed motor or spindle motor, thereby effecting movement of contacts 154–OL or 155–OL to open position. In the event this occurs, the seal-in circuit for the feed motor relay 152 via contact 152–3X would be interrupted.

To effect rightward spindle rotation, the spindle push button rotation control switch 38A must be rotated to a rightward position, thus moving contact bar 159 out of engagement with line 5X and moving a lower contact bar associated therewith into bridging engagement with terminals interconnected in line 6X connected to the spindle right motor control relay 162. Spindle rotation control switch 38A is always positioned to effect required spindle rotation prior to depressing master start button switch 39A.

Depressing the master stop button switch 39B momentarily will immediately interrupt the holding circuit via closed contact bar 162–4 or 163–4, depending upon whether the spindle motor is energized for right or left hand rotation. In the event switch 39B is depressed, the holding circuits will be interrupted to both the spindle motor starting relays 162 or 163, as well as to the feed motor starting relay 152.

Assuming now that both motors have been energized by depressing start switch 39A, closure of energized relay 163, line 5X, has likewise effected closure of associated contact 163–5 at line 8X to connect, thereby transmitting current from energized supply conductor 148 to energize vertical conductor 166. Conductor 165 already has been energized via normally closed table stop switch 39C to vertical conductor 150, the latter being connected to conductor 147 by closed contacts 152–4 and 163–4 respectively. Upon energization of the conductors 165 and 166, the various control elements for effecting rotational movement of the tool spindle, and selected longitudinal movement of the work supporting table are conditioned for controlling machine operation. With this condition existing, therefore, table movement may be effected either in response to push button control or automatically in response to predetermined coded operation of the switch plungers 30 to 33 inclusive, FIG. 3.

Simultaneously with the energization of control circuit conductors 165 and 166, a rectifier bridge 268, FIG. 11A at 54X, is energized by input supply conductors 169 and 170 respectively. Input supply conductor 169 is energized by connection to horizontal line 6X and thence via normally closed master stop button switch 39B, and closed contact bar 163–4 to energized supply conductor 147. Rectifier bridge input conductor 170 is connected directly to receive current from conductor 148. Upon energization of the rectifier bridge circuit 268, the output terminals thereof are connected to supply direct current to vertical supply conductors 173 and 174 respectively.

As explained with reference to FIG. 9, dynamic activation of the machine for operation results in an immediate energization and consequent engagement of both directional clutches 124 and 125 to brake the table against movement in either direction. The directional clutches 124 and 125 are respectively provided with energizable solenoids represented as 124S and 125S, reading along 66X and 69X, in FIG. 11A.

To insure immediate activation of the novel dynamic brake upon energization of D.C. input conductors 173 and 174, a circuit is completed from conductor 173 via the normally closed contact bar of table crank interlock switch 180, line 44X, horizontal conductor 181 and thence through normally closed contacts 176–8 and 175–5 to conductor 182 connected to effect energization of directional clutch solenoid 124S, the energized circuit being completed to vertical D.C. conductor 174. At the same time, a parallel holding circuit is established from conductor 181 via conductor 184 through the normally closed contact 177–8 to conductor 185. The parallel holding circuit continues from conductor 185 via normally closed contact bar 175–8 and thence through conductor 186 to energize directional clutch solenoid 125S connected to the D.C. line 174. At the same time, referring to line 61X a circuit is completed from energized D.C. conductor 173 via normally closed contact 151–6 to horizontal conductor 187 connected to effect energization of the spindle brake solenoid 82S. With the power supply and control circuits energized as described, it will be apparent that spindle drive clutch solenoid 80S, line 57X, as well as rate change clutch solenoids 120S and 116S, lines 62X and 64X, are deenergized. The normally closed contact 151–6, line 61X, is moved to open position whenever a push button selector switch 38C, line 13X, is depressed to energize spindle control relay 151, line 15X. If selector switch 38C is in the "run" position as shown, contact bar 151–6, line 61X is retained in open position. If selector switch 38C has been placed in the "jog" position, contact 151–6, will be retained in open position only as long as the spindle switch is depressed. Movement of contact 151–6 to open position merely permits de-energization of spindle brake solenoid 82S and simultaneous energization of spindle drive clutch solenoid 80S.

Whenever automatic spindle stop switch 38B, 59X, is in the "off" position as shown, spindle brake solenoid 82S is de-energized upon movement of contact 151–6 to open position to interrupt the circuit to conductor 187. At the same time energization of spindle drive clutch solenoid 80S is effected by completion of a circuit from line 174 via simultaneously closed contact 151–5 to conductor 190, the circuits being completed via a shunt path through contact bar 189 of the upwardly closed automatic spindle stop selector switch 38B. Movement of spindle stop switch 38B to the "on" position effects movement of upper contact bar 189 to open circuit interrupting position and lower contact bar 191 into bridging engagement between energized input D.C. line 173 and horizontal conductor 192. With this condition existing, a supply circuit is available from conductor 192, but is connected to energize to the spindle drive clutch 80S and de-energize the spindle brake solenoid 82S, only during feed movements of the table. During rapid traverse movement of the table, that portion of the circuit between energized conductor 192 and conductors 190 and 187 is operative to de-energize the spindle clutch solenoid 80S and effect energization of the spindle brake solenoid 82S. Thus, with the automatic spindle stop switch 38B in the "on" position, the spindle operates only during feeding movements of the table, and is braked to stop during rapid traverse movements of the table.

As a prerequisite to operating the machine table, either during manual mode or automatic mode, it is necessary to momentarily depress spindle selector switch 38C, line 13X, after the switch has been positioned in the rightward "run" position as shown. Upon depressing switch 38C, a circuit is established from energized vertical conductor 158 via a contact bar of normally closed spindle stop switch 39D to conductor 193 connected to effect immediate energization of the relay coil 151, having associated contact bars in lines 9X, 14X, 21X, 41X, 56X and 61X. A holding circuit for retaining coil 151 energized is established upon closure of contact 151–2 through contact bar 194 which is continuously retained in closed position whenever spindle switch 38C is in the "run" position. In the event push button selector switch 38C is in "jog" position, contact bar 194 is moved to open position in a manner that momentarily depressing push button switch 38C is operative to effect momentary energization of coil 151 for effecting jogging movement of the tool spindle.

With relay coil 151 retained in energized position, another contact bar 151–3, line 21X, is retained in bridging engagement between conductor 196 and to conductor 216 connected to conductor 197. After these various circuit conditions have been established, the machine table may be moved in either manual or automatic mode. The novel results achieved by the invention are due, in part, to the fact that four limit switches 30S, 31S, 32S and 33S are actuated in code fashion to provide a total of seven movements or functions of worktable, or work support movement. The actual code arrangement for effecting selective actuation of one or another of the switches 30S to 33S, inclusive, is illustrated in FIG. 7. As there shown, left limit stop 53L effects actuation simultaneously of switches 30S, 31S and 32S. Referring to FIGS. 3 and 7, trip dog 50 is operative to actuate limit switch plunger 31 to effect the function of left feeding movement of the table. In a similar manner, each of the other dogs listed in FIG. 7 actuates one or more of the switches to effect the function indicated.

Although the legends and coding illustrated in FIG. 7 clarifies actual switch operation, such an explanatory chart is not necessary in operating the machine. Likewise, referring to FIGS. 3 and 5, each of the dogs shown is provided with a different reference numeral to facilitate the description. Actually, however, the left feed dog 50 is identical in configuration to the right feed dog 46. The dog 50 is so secured to the slot 28A that land 202, and cam faces 203 and 204 on either side of the land, extend upwardly and are moved with the table 28 in a horizontal plane permitting engagement only with switch plunger 31 presented by limit switch 31S. Although dog 46 is identical in configuration to left dog 50, dog 46 is reversedly secured to the T-slot 28A in a manner that land 202 extends downwardly and is horizontally aligned to engage switch plunger 32 carried by limit switch 32S.

It should be further noted that rapid traverse dogs 44, 47, and 51 are of identical configuration. In FIG. 3, left rapid traverse dog 44 is so secured within the table T-slot 28A as to engage only the switch plunger of upper limit switch 30S. Right rapid traverse dogs 47 and 51, on the other hand, are secured to the table in a manner to engage the plunger presented by switch 33S. A principal advantage of the invention is that required table cycles can be preset by simply securing both the feed dogs and the rapid traverse dogs at the required positions along the table, with the arrows, such as the arrow 205 carried by the dog 50, positioned to indicate the actual direction of table movement with respect to the central trip post 29 that carries the code actuated switch plungers 30 to 33, inclusive.

The stop "F" feed dog 48 does not need to be reversibly positioned in the table T-slot 28A. In all cases, stop dog 48 actuates only the two center plungers presented by limit switches 31S and 32S to effect a dynamic stop condition, with resumption of table movement being effected at feed rate. The stop "R" rapid dog 60 is positioned in FIG. 5 in a manner to engage the plungers presented by limit switches 30S and 33S. In all cases, stop dog 60 effects a dynamic table stop and conditions the control circuit for resuming table movement at a rapid rate of travel. It will be apparent that lands 208 and 209 presented by stop dog 60 are offset slightly with respect to each other. Thus, when the table is being moved to the right with respect to trip post 29, land 208 engages upper switch plunger 30 slightly in advance of land 209 engaging plunger 33. In a similar manner, during leftward table movement land 209 of dog 60 engages switch plunger 33 slightly in advance of land 208 engaging switch plunger 30. The cam faces and lands 208 and 209 presented by a stop dog 60 overlap, however, in a manner to effect coded actuation of the limit switches 30S and 33S respectively.

It will be apparent that reverse dogs 45 and 52 are of identical configuration, and are reversibly secured to the T-slot 28A. The lands presented by the reverse dogs are offset slightly to provide for a slight delay in actuating one of the two code actuated switches.

Another important novel advantage achieved by the invention is the fact that the four limit switches carried by trip post 29 cooperate with the circuit to constitute in effect a memory for the control system, and are directionally sensitive with respect to actual movement of the worktable during any preset automatic cycle of operation. For example, during rightward movement of the worktable, neither direction or rate of table movement is affected even though left feed dog 50 is moved into switch actuating engagement with limit switch 31S. Likewise, during right table movement left rapid dog 44 will have no effect on table movement even though switch 30S is actuated thereby. In similar manner, during leftward table movement neither right feed dog 46 nor right rapid dog 51 will affect table control even though switches 32S and 33S are respectively actuated thereby. This unique feature of machine control is achieved in part by an improved series of overlapping parallel holding circuits established in the electrical circuit, FIGS. 11 and 11A.

As shown in FIGS. 11 and 11A, each of limit switches 30S to 33S inclusive is provided with a normally closed contact bar and a normally open contact bar. Upon dog actuation of switch 30S, for example, normally closed contact 30C is moved into open circuit interrupting position and normally open contact 30-0 is moved into bridging engagement with its associated contacts. Normally closed contacts 30C and 33C of switches 30S and 33S are connected in parallel between conductors 197 and 201. The normally open contacts 30-0 and 33-0 are connected in parallel between conductor 201 and horizontal line conductors 212 and 213 respectively. To more fully explain the unique parallel and series, interconnection of the limit switches between conductors 197 and 198, vertical conductor 201 is represented as being connected by short conductor 214 to conductor 215. Attention is directed to the fact that normally closed contacts 31C and 32C respectively, associated with limit switches 31S and 32S are connected in parallel between conductors 215 and 198. Normally open contact bars 31–0 and 32–0 are connected in parallel between conductor 198 and horizontal conductors 217 and 218 respectively.

In addition, a series connection is established from conductor 198 via normally closed contacts 31C, 32C to conductors 215, 214, 201; this portion of the circuit being in series via normally closed switch contacts 30C, 33C to the conductors 197 and 216. In a similar manner, four separate parallel circuits may be respectively established from conductor 196 to energized input conductor 165 during machine operation. During directional movement of the worktable in either direction, it is essential that a continuous holding circuit be maintained from conductors 198 to 197 and thence via closed contact 151–3 of energized relay 151 to conductor 196, the latter in turn being connected by one or another of four parallel circuits to energized line 165.

Each of the limit switches 30S to 33S inclusive has associated with it one signal control relay 220 to 223 inclusive. Energization of relay 220 operates to actuate associated contacts respectively located in lines 20X, 23X, 25X and 43X. Contacts associated with relay 221 may be found in horizontal lines 16X, 17X, 20X, 28X, 31X, 39X, 47X and 48X. The contacts operated upon by relay 222 are located in lines 17X, 20X, 28X, 31X, 39X, 47X and 48X; while signal relay 223 is operative upon contacts found in lines 20X, 24X, 38X and 49X. Thus, whenever limit switch 30S is actuated by one or another of the trip dogs, normally open contact 30–0 completes a circuit from conductor 201 to conductor 212 which is connected to relay 220, the latter in turn operating to move its associated contacts to open or closed position. Relay 220 is, in effect, an extension of limit switch 30S. In a similar manner, actuation of switches 31S, 32S and 33S in response to trip dogs effects energization of corresponding relays 221, 222 or 223, each of which constitutes an extension of function of the respectively associated limit switches.

*Automatic Cycle Operation*

In FIGS. 3, 5 and 6, trip dogs have been secured to the table in silghtly different arrangements to illustrate three separate, different cycles of table operation. It is emphasized that the setting of the dogs in these three figures is for illustrative purposes only, and it will be apparent that the various dogs can be secured to the table in various other combinations to produce any particular, preselected required cycle of operation. Thus, after initiating a cycle of operation, the table rate can be automatically changed from rapid to feed, or vice versa, the direction of travel can be reversed, and the machine can be brought to a dynamic stop, permitting resumption of the original direction of travel at either a feed or rapid rate.

To illustrate the interaction between the control dogs and the four coded switches 30S to 33S inclusive, reference is now made to FIG. 6 in which the dogs have been secured to the table in a manner to effect a continuous automatic cycle of worktable movement, utilizing the full range of allowable movement.

In describing the FIG. 6 cycle of operation, it is first assumed the machine has been dynamically activated by momentarily depressing switch 39A, line 9X of FIG. 11, and that spindle "run" switch 38C has been depressed to complete a holding circuit for energizing relay 151.

Likewise, it will be assumed that automatic spindle stop switch 38B has been moved to the "off" position as shown in FIG. 11, and that selector switch 38D is in automatic mode position as shown. Movement of selector switch 38D to automatic position effects movement of upper contact bar 227 into bridging engagement between conductors 228 and 229, and lower contact bar 231 into open position to prevent circuit connection between conductors 232 and 233. With these conditions established, as hereinbefore described, directional clutch solenoids 124S and 125S, lines 66X and 69X, are energized; and, spindle brake solenoid 82S, line 60X, is de-energized while spindle clutch solenoid 80S, line 57X is energized for effecting continuous rotation of the spindle.

Assuming now that the worktable is positioned in its central position as shown in FIG. 6, the automatic cycle there illustrated may be initiated by momentarily depressing table right push button 35R, line 44X in FIG. 11A. Depressing table right start button 35R immediately starts rightward movement of the worktable relative to switch plungers 30 to 33 inclusive as shown in FIG. 6. Once initiated, this cycle will continue automatically under control of the table trip dogs with rates being changed from rapid to feed as preselected, and reversal in direction being accomplished as required, until table stop switch 39C, line 11X in FIG. 11, is momentarily depressed to stop table movement.

Upon closure of switch 35R, a starting circuit is completed from energized conductor 165 to conductor 239, and thence through normally closed contact 223–4 to conductor 240 and conductor 250. The circuit continues from conductor 250 through normally closed contact 176–4, through normally closed contact bar 35 CL of the table left start switch 35L, and thence via another normally closed contact 176–3 to effect energization of the table right directional relay 177, the circuit being completed to conductor 166. As this happens, a parallel circuit has been established via conductor 252 to energize indicator light 253 providing a visual indication that the control is established for rightward table movement.

The holding circuit for retaining table right directional relay 177 energized to closed position, is then established from conductor 239, vertical conductor 198, normally closed contacts 32C, 31C to conductor 215 connected by conductor 214 to conductor 201. The holding circuit continues from 201 via normally closed limit switch contacts 30C, 33C to conductor 197, conductor 216, and thence through the now closed contact 151–3 of energized relay 151 to conductor 196. The holding circuit for retaining table right relay 177 energized is then completed from conductor 196 via the now closed contact 177–25X of energized relay 177 and conductor 256 to the input conductor 165. Table right relay 177 is operative to actuate various contacts found in lines 21X, 37X, 43X, 44X, 57X, 59X, 64X and 69X.

At this time, energization of the table right relay 177 in response to depressing table right push button 35R for initiating the cycle illustrated in FIG. 6, starts rightward table movement at a feed rate. After the continuous cycle illustrated in FIG. 6 has been initiated, that portion of table travel indicated as rapid right continues until the feed right dog 46 depresses switch plunger 32. Upon originally starting the cycle, however, energization of relay 177 effects closure of a contact 177–7, line 64X, to complete a circuit from energized D.C. conductor 173 for energizing the feed clutch solenoid 116S, this circuit extending via normally closed 175–4, since rapid traverse relay 175 is now de-energized. At the same time, the normally closed contact 177–8, line 69X, is moved to open position, interrupting a circuit from energized conductor 184 to de-energize directional solenoid 125S, permitting directional solenoid 124S to remain energized. As hereinbefore explained, energized directional clutch solenoid 124S then cooperates with energized feed clutch solenoid 116S to effect rightward feeding movement of the work table.

With the automatic spindle stop selector switch 38B, line 59X, in the "off" position, the spindle brake solenoid 82S is de-energized and the spindle clutch solenoid 80S is energized to effect continuous rotation of the tool spindle during both feed and rapid traverse portions of the worktable cycle.

In the event switch 38B is in the "on" position, the spindle would not be rotating at the start of the cycle, and energization of table right relay 177, line 46X, would effect movement of an associated contact 177–6, line 59X, to de-energize the brake solenoid 82S; and, normally open contact 177–5, line 57X, would be moved to closed position to initiate energization of the spindle clutch solenoid 80S. With switch 38B in the "on" position, the spindle will rotate only when the table moves at feed rate.

Feeding movement of the worktable continues in a rightward direction, with engagement of the feed right dog 46, FIG. 6, having no effect upon the cycle as it engages switch plunger 32. Thus, rightward movement continues at feed rate until the rapid left dog 44 and reverse dog 45 actuate three of the trip post switch plungers in code fashion to initiate leftward table movement at the rapid rate.

The reverse dog 45 may be secured to the table alone for effecting reversal in the direction of table movement to a left feed direction. With the rapid left dog 44 secured to the table in coordinated relationship with reverse dog 45, however, the control circuit is so conditioned as to effect reversal in a leftward direction at a rapid rate. A land 259 presented by rapid left dog 44 is so aligned above a land 260 presented by the reverse left dog 45 as to effect the sequential actuation of switch plungers presented by limit switches 30S and 32S, respectively. Shortly thereafter, as the table continues to move rightwardly at feed rate a land 261 engages the plunger of switch 33S. The lands 260 and 261 of the dog 45 are offset slightly to prevent a simultaneous action of limit switches 32S and 33S.

With this condition existing, at the moment feed movement is reversed to a rapid left direction, limit switches 30S, 32S and 33S, although sequentially actuated, are momentarily simultaneously retained in actuated condition by their respective plungers being engaged by the associated dogs. During this interval, it is essential that the holding circuit be maintained from conductor 198, FIG. 11 to conductor 197 in order that table left relay 176, line 43X, can be energized to initiate table left movement immediately upon the de-energization of previously energized table right relay 177, line 46X.

Immediately prior to reversal, sequential operation of switches 30S, 32S and 33S, effects corresponding sequential energization of signal control relays 220, 222 and 223. After this happens, the contact bars 30C and 33C are retained in open position, this condition normally serving to interrupt the holding circuit from conductor 197 to conductor 201. As these switch actuations take place, the holding circuit from line 201 is transferred successively from open contacts 30C and 33C to contact 222–3 which is closed upon energization of relay 222, prior to subsequent opening of contact 33C to maintain an overlapping holding circuit to conductors 197 and 201. In the sequence of actuation, in other words, switch 30S has first been depressed, moving contact 30C to open position, and closing 30–0 to energize relay 220. Next, switch 32S is actuated to close contact 32–0 and energize relay 222, the latter having a contact bar 222–3 that is closed to establish a parallel overlapping circuit from 201 to 197. This contact 222–3 maintains the circuit upon subsequent movement of switch contact 33C to open position, this entire overlap being effected in closely coordinated relationship.

During the interval of effecting a reversal from feed right to rapid left movement, a similar overlapping holding circuit is sequentially established along the parallel lines interconnected between conductor 196 and energized conductor 165. Inasmuch as these overlapping circuits are effectuated in coordinated time relationship to the actuation of the coded switch plungers and the establishment of conditions for controlling reversed movement, attention is now directed to the effect of sequentially energizing signal control relays 220, 222 and 223.

To condition the control system for subsequent leftward movement at a rapid rate, energization of signal control relay 220 effects closure of normally open contact bar 220–3, located at 35X, to interconnect conductor 263 to conductor 228. Next, energization of control relay 222 effects movement of normally closed contact 222–8, line 48X, to open position, thus interrupting the circuit from energized conductor 198 to conductor 250 in preparation for effecting subsequent de-energization of table right directional relay 177. At the same time, energization of relay 222 effects closure of a normally open contact 222–1 and simultaneously therewith opening of a normally closed contact 222–2, line 17Z interconnected between lines 165 and 196. At this time, there is then established an overlapping holding circuit from energized line 165 via the now closed contact 222–1, and thence via a conductor 264 and a normally closed contact 221–2 to the conductor 196; this circuit being maintained in overlapping relationship with the circuit through contact 177–1 which is still retained in closed position due to continued energization of table right relay 177.

At this time, energization of signal control relay 223 effects movement of a normally closed associated contact 223–4 to open position interrupting the holding circuit from line 239 to 240, thereby effecting de-energization of the table directional relay 177. De-energization of relay 177 permits movement of the normally closed contacts associated therewith in lines 43X and 44X to be moved to normally closed position, thereby effecting an immediate energization of the table left directional relay 176. This circuit is completed from energized conductor 198 via a normally closed contact 221–7 to a conductor 266. In sequential coordinated relationship, another contact 177–1, line 21X, is moved to open position and the contact 176–1 is moved into closed position to continue the overlapping holding circuit between vertical energized conductor 165 and the conductor 196, inasmuch as contact 222–1 to conductor 264 remains closed during this interval.

It is emphasized that the actuation of switches 30S, 32S and 33S, although effected in closely timed sequential relationship, occur practically simultaneously to effect the corresponding sequential energization of signal control relays 220, 222 and 223; the latter in turn, being energized only momentarily to effect the required, timed overlapping holding circuits between conductor 198 and energized conductor 165. It is further emphasized, that as reversed movement in a leftward direction at a rapid rate takes place, the respective dogs are moved leftwardly to permit switches 30S, 32S and 33S to resume their normal conditions illustrated in FIG. 11. As this happens, of course, signal control relays 220, 222 and 223 are de-energized, and the associated contacts thereof returned to their normally open or closed positions.

During the brief interval in which reverse movement from feed right to left rapid takes place, table right relay 177 and table left relay 176 are respectively operative to effect the required circuit changes in the solenoid control circuit between energized lines 173 and 174. Upon de-energization of table right relay 177, an associated contact 177–7, line 64X, is moved to open position to de-energize the feed clutch solenoid 116S. As hereinbefore described, directional clutch solenoid 124S is energized both during rightward movement at feed rate and during left movement at rapid rate. Originally, during feed right prior to reversal, this circuit was energized by normally closed contacts respectively associated with table left relay 176 and rapid traverse control relay 175, to complete a circuit from conductor 181 to 182. Upon de-energization of table right relay 177, a shunt circuit condition is established from conductor 181, conductor 184, through the now closed contact 177-8 of relay 177 to a conductor 185.

Next, upon energization of table left relay 176, a contact bar 176-2 associated therewith is moved to closed position interconnecting energized conductor 198 to conductor 263, line 35X. Inasmuch as signal control relay 220 is still energized, the circuit continues through the closed contact 220-3 and thence via conductors 270 and 228, contact bar 227 and conductors 229 and 230 to energize rapid traverse automatic relay 179. A seal-in circuit for retaining relay 179 energized upon subsequent de-energization of signal control relay 220, is then established from conductor 263 via a now closed contact 179-1 to a vertical conductor 270 interconnected with the conductor 228. This circuit likewise continues through another now closed contact 179-2 to a conductor 272 connected to effect energization of rapid traverse control relay 175. Thereupon, referring to line 66X, the normally closed contact 175-5 is moved to open position which would normally effect de-energization of directional clutch solenoid 124S. However, with a circuit path having been previously established to conductor 185, line 69X, a normally open contact 175-6 is moved to closed position completing a circuit to vertical conductor 269 connected via conductor 182 to retain directional clutch solenoid 124S in energized condition. Another normally open contact 175-3 associated with energized rapid traverse control relay 175 is moved to closed position, completing a circuit from energized conductor 173 along line 62X to effect energization of the rapid traverse clutch solenoid 120S, the latter cooperating with the already energized directional clutch solenoid 124S to effect immediate leftward movement of the table at a rapid rate. As this occurs, of course, the respective dogs are moved out of engagement with the code operated switch plungers 30, 32 and 33 to effect an immediate de-energization of signal control relays 220, 222 and 223.

Referring again to the cycle control chart, FIG. 6, leftward movement of the worktable continues at a rapid rate, with the right feed dog 46 having no effect as it momentarily depresses the switch plunger 32. Leftward rapid table movement continues until the land associated with the left feed dog 50 engages the trip plunger 31 carried by the trip switch control post 29. Upon actuation of the switch 31S, contact 31-0 is moved to closed position effecting a connection to conductor 217 connected to energize a signal control relay 221. This circuit is completed from vertical conductor 215, closed contact 32C to conductor 198 and thence through the momentarily closed contact bar 31-0. Momentary energization of the relay 221 effects a change in rate from rapid to feed rate without interrupting the continuity of leftward movement. Momentary energization of signal control relay 221 effects movement of an associated contact bar 221-6, line 33X, to open position thereby interrupting the seal-in circuit to automatic rapid traverse relay 179, the de-energization of which in turn effects de-energization of rapid traverse control relay 175. As hereinbefore explained with reference to FIG. 9, the rotation of direction of directional shaft 122 is reversed to obtain an instantaneous brake effect in a manner to immediately change the rapid rate to a feed rate. To accomplish this, clutches 120 and 124 for effecting leftward movement at rapid rate are de-energized, and simultaneously therewith, clutches 116 and 125 are energized. Referring again to the circuit diagram in FIG. 11, this is accomplished upon de-energization of rapid traverse control relay 175, a normally open contact 175-3 associated therewith being moved to open position in line 62X to de-energize the rapid traverse clutch solenoid 120S. At the same time, another contact 175-4 in line 64X is moved to normally closed position completing a circuit via the now closed contact 176-7 to a conductor 274 for immediately energizing the feed clutch solenoid 116S. At the same time, de-energization of the rapid traverse control relay 175 permits movement of another associated contact 175-6 to open position interrupting the seal-in circuit to vertical conductor 269 in a manner to de-energize the directional clutch solenoid 124S, line 66X. Simultaneously therewith, another contact 175-8, line 69X, is moved to normally closed position bridging a circuit from conductor 185 to conductor 186 for energizing directional clutch solenoid 125S.

Leftward movement of the table continues at feed rate until dogs 51 and 52 effect actuation of limit switches 33S, 31S and 30S. In the absence of the rapid rate dog 51, reverse dog 52 would be positioned to effect reversal at feed rate in a rightward direction, irrespective of whether the dog 52 had been moved into engagement with associated limit switches in a leftward feed or rapid rate.

With the dogs 51 and 52 coordinately positioned as shown, a land 277 presented by rapid rate dog 51 engages switch 33S slightly in advance of a land 278, presented by right reverse dog 52, engaging the switch 31S. In a similar manner, the portion of the land 279 of dog 52 engages switch 30S slightly later than land 278 engages switch 31S. The successively sequential actuation of switches 33S, 31S and 30S is operative to effect rapid reversal in a rightward direction.

Upon actuation of switch 33S, FIG. 11, signal control relay 223 is first energized, effecting closure of a normally open contact 223-3, line 38X, thereby completing a circuit from a conductor 282 to vertical conductor 270 interconnected with conductor 228. Thus, closure of relay contact 223-3, line 38X, completes a circuit from conductor 282 for conditioning the circuit to effect subsequent energization of the automatic rapid traverse control relay 179. With the switch contact 33C being held in open position, the holding circuit from conductor 201 is completed through the still closed switch contact 30C, line 22X, to conductor 197. Due to the slight offset between lands 278 and 279 of reverse dog 52, FIG. 6, the holding circuit is maintained through contact 30C until an overlapping, parallel circuit is effected by closure of 221-3, line 20X, which occurs upon energization of signal control relay 221. To energize relay 221, switch 31S is actuated by land 278 of dog 52, permitting a portion of the holding circuit to be maintained from conductor 198 via the closed contact switch 32C to conductor 215. Immediately upon completion of the parallel circuit via closed contact 221-3, the land 279 of reverse dog 52 actuates switch 30S thus moving switch contact 30C to an open position. Simultaneously, switch contact 30-0 is closed to energize signal control relay 220.

During the interval in which right reversal takes place, another overlapping, parallel holding circuit is continuously maintained from conductor 196 to energized input conductor 165 due to the overlap in energization of the signal control relays with the concomitant de-energization of the table left relay 176 and subsequent energization of the table right relay 177. As the table advances toward the control post in a leftward direction at feed rate, this circuit is initially maintained by close contact 176-1 interconnected between conductor 196 and 165. With table left relay 176 still energized, the energization of signal control relay 221 effects closure of a contact bar 221-1 to complete an intermediate, overlapping holding circuit from conductor 283 via vertical conductor 264 and the normally closed contact 222-2 to the vertical conductor 196. The overlapping parallel holding circuit from conductor 283 to conductor 264 is effected immediately prior to de-energization of table left relay 176; after which table right relay 177 is energized to effect the final holding circuit through closed contact 177-1 to conductor 256 for establishing a flow of current from energized conductor 165 to conductor 196 during rightward movement of the worktable.

During leftward feeding movement of the worktable, clutch solenoids 116S and 125S are energized; while for rightward movement at a rapid rate, clutch solenoids 120S and 125S are energized. Therefore, the circuit conditions for effecting reversal from left feed to right rapid require only the de-energization of clutch solenoid 116S and energization of the rapid traverse clutch solenoid 120S. Initially, during this portion of the cycle calling for reversal from feed left to rapid right, signal control relay 223 was energized to effect movement of normally closed contact 223–4, line 49X, to open position interrupting a circuit from conductor 239 to conductor 240. In addition to establishing the overlapping parallel holding circuit between conductors 283 and 264, at 16X, energization of signal control relay 221 opens a normally closed contact 221–7, line 44X, to interrupt the energized circuit to vertical conductor 266, conditioning this branch of the circuit for subsequent de-energization of the table left relay 176.

As soon as the third signal control relay 220 is energized, an associated closed contact 220–4, at 43X, is opened to interrupt the circuit from energized conductor 198 to conductor 266, thus de-energizig table left relay 176. Movement of table left relay 176 to de-energized open position effects immediate closure of the associated normally closed contacts 176–3 and 176–4, lines 47X and 48X, thereby effecting energization of the table right relay 177. It is emphasized that the novel improved results achieved by the applicants permit continuance of the holding circuit from the energized input conductor 165 via the sequentially effected, parallel overlapping holding circuit to the conductor 196; as well as, continuance of the circuit from the conductor 197 via the overlapping parallel holding circuits to the conductor 198. Inasmuch as conductor 198 is continuously energized during reversal of table movement, a condition is maintained for de-energizing the table left relay 176 and energizing the table right relay 177.

De-energization of the table left relay 176 permits movement of contact 176–7, at line 65X, to normally open position thereby interrupting the circuit to conductor 274 and de-energizing the feed clutch solenoid 116S. At the same time, movement of another contact 176–8, line 68X, to its normally closed position conditions a circuit from conductor 181 to retain directional clutch solenoid 125S energized upon subsequent energization of the table right directional relay 177. As hereinbefore explained, with reference to a left reversal, energization of table right relay 177 effects movement of a normally open contact 177–2, at 37X, to closed position to complete a circuit from energized conductor 198 to conductor 282. Inasmuch as signal control relay 223 is still energized at this moment, a circuit is thus completed from conductor 282 via the closed contact 223–3 to conductor 228 for energizing the automatic rapid traverse control relay 179. Energization of this relay effects a seal-in circuit by closure of an associated contact 179–3, line 37X, completing a shunt circuit between conductors 282 and 228. Likewise, closure of another normally open contact 179–2, line 36X completes a circuit from conductor 270, and thence to horizontal conductor 271 to conductor 272 for effecting energization of the rapid traverse control 175. Thereupon, an associated contact 175–3, line 62X, is closed to effect immediate energization of the rapid traverse clutch solenoid 120S. At the same time, a normally closed contact 175–4, in line 64X, is opened to preclude re-energization of the feed clutch solenoid 116S upon closure of normally open contact 177–7, which is effected by energization of the table right relay 177.

Energization of rapid traverse control relay 175 effects movement of an associated normally closed contact, 175–8 in line 69X, to open position thus interrupting the normal feed left holding circuit extending from conductor 185 to conductor 186. However, directional clutch solenoid 125S is maintained in energized condition by means of an immediately established circuit from conductor 181, closed contact 176–8, conductor 286, closed contact 175–7 of energized relay 175, and a conductor 287 connected to the conductor 186. Thus, conditions are established in the required overlapping sequence in the solenoid control circuit, between energized D.C. conductors 173 and 174, to effect energization of rapid traverse clutch solenoid 120S and directional clutch solenoid 125S for initiating reverse movement in a rightward direction at a rapid rate of travel.

Referring again to FIG. 6, it will be apparent that during rightward rapid movement of the worktable, the feed left dog 50 secured to the table will actuate limit switch 31S. A unique feature of the applicants' invention is that actuation of limit switch 31S by the feed left dog 50 during rightward movement of the table will have no effect on the control system. In other words, the control system is directionally sensitive and will respond only to those dogs carrying the "arrow" indicia that corresponds to the actual direction of worktable movement. Actually, depressing switch plunger 31 by the feed left dog 50 of the rightwardly moving table does effect a momentary energization of the corresponding signal control relay 221. With the table continuing to move in a rightward direction at the rapid rate, as required, however energization of the signal control relay 221, FIG. 11, has no effect on any of the clutch solenoids, or the rapid traverse relay 179.

After feed left dog 50 actuates plunger 31 with no effect, table movement in a rightward direction at rapid rate continues until the land of feed right trip dog 46 momentarily depresses switch plunger 32, effecting an immediate change from a rapid to a feed rate in a rightward direction. As seen in FIG. 11, momentary actuation of the limit switch 32S in response to feed right dog 46 effects a corresponding momentary energization of signal control relay 222. Consequently, normally closed contact 222–6, line 39X, is opened to interrupt the holding circuit through the closed contact 177–2 of energized relay 177, plus effecting de-energization of relays 179 and 175. Movement of contact 173–3, line 62X, to normally open position upon de-energization of relay 175 effects an immediate de-energization of rapid traverse clutch solenoid 120S. Likewise, closure of contact 175–4, line 64X, completes a circuit through the contact 177–7 of energized relay 177 to the conductor 274 for energizing the feed clutch solenoid 116S. At the same time, de-energization of the rapid rate relay 175 interrupts the energized circuit to directional clutch solenoid 125S, and effects closure of a contact 175–5, line 66X, completing a circuit to conductor 182 in a manner to energize the directional clutch solenoid 124S. Conditions have thus been re-established for continuing rightward movement of the worktable at feed rate until dogs 44 and 45 engage switch plungers 30, 32 and 33 for immediately initiating reverse movement of the worktable in a leftward direction at a rapid rate.

One initiated, the automatic cycle illustrated in FIG. 6 will continue indefinitely until this cycle is stopped by manually depressing the table stop switch 39C, FIG. 11. Irrespective of whether the worktable is being moved at feed or rapid traverse rates during the automatic cycle illustrated in FIG. 6, depressing the table stop button 39C effects immediate stopping of table movement, as well as an automatic re-energization of the directional clutch solenoids 124S and 125S to immediately brake the worktable against movement in either direction. It will be apparent that depressing the table stop switch 39C, FIG. 11, will interrupt the holding circuit from energized input supply conductor 150 to conductor 165 and, consequently, the several series interconnected, parallel holding circuits to the conductor 198. As this happens, either the table left relay 176 or table right relay 177, as well as rapid traverse relays 179 and 175, will be immediately de-energized.

A comparison of FIGS. 5 and 6 reveals that the feed, rapid traverse, and reverse dogs are secured to the table in identical fashion in each of these figures. The only difference is that a stop "R" dog 60 is secured to the table T-slot 28A between the feed dogs 46 and 50 in FIG. 5. The purpose of the stop dog 60 is to provide a dynamic stop condition permitting resumption of the original direction of table movement at a rapid rate. With the table in its central intermediate position upon the frame, lands 208 and 209 presented by the stop "R" dog 60 will engage trip plungers 30 and 33, this position being indicated as a center stop position. From the center stop position, depending on the original direction of movement, table movement can be initiated in either direction for immediately resuming table movement at a rapid rate by momentarily depressing one or another of the table push button start switches 35L or 35R. If the table is started rightwardly from the center stop, rightward movement at rapid rate continues until the right dog 46 engages switch plunger 32 effecting immediate change to the feed rate. Feed rate would then continue until dogs 44 and 45 secured to the leftward end of the worktable T-slot 28A simultaneously engage plungers 30, 32 and 33 to initiate reverse movement in a leftward direction at rapid rate. Leftward rapid movement would then continue until the two lands 208 and 209 of stop "R" dog 60 engage plungers 30 and 33, the table now being returned to the dynamic center stop position. Resumption of leftward table movement at a rapid rate is then effected by momentarily depressing the table left push button switch 35L, the change from rapid left to feed left being effected in response to the feed left dog 50 engaging plunger 31. Left feeding movement would then continue until dogs 52 and 51 secured to the rightward end of the table T-slot 28A engage switch plungers 30, 31 and 33 to effect reversal in a rightward direction at a rapid rate. Movement of the worktable is again stopped as soon as the respective lands presented by the dog 60 again engage the switch actuating plungers 30 and 33.

The dog setting and cycle chart illustrated in FIG. 5 are arranged to perform a split, automatic cycle of machining operations upon workpieces respectively secured to the leftward and rightward ends of the worktable. The arrangement is such that during rightward feeding movement of the worktable a milling operation is performed upon a workpiece secured to the leftward end thereof, while a completed workpiece is being unloaded from the rightward end of the table and replaced with another workpiece. In similar manner, as a machining operation is being performed upon a workpiece secured to the rightward end of the worktable, a new workpiece is secured to the leftward end thereof. In each case, however, table movement is automatically stopped at the center position to preclude accidents and insure that another workpiece is properly loaded.

Inasmuch as the effect of feed, rapid, and reverse dogs upon table movement has been hereinbefore described, it will now be assumed that the table is moving rightward at a rapid rate in a manner that the lands 208 and 209 presented by the stop "R" dog 60 sequentially engage the upper switch plunger 30 and the lower switch plunger 33, in that order. Referring to FIG. 11, sequential actuation of limit switches 30S and 33S effects closure of normally open contacts 30–0 and 33–0 to effect a corresponding sequential energization of table control relays 220 and 223. The sequence of energization of control relays 220 and 223 is necessary to condition the entire control system for the resumption of table movement in a rightward direction. The worktable is brought to a dynamic center stop condition during this interval upon sequential movement of normally closed switch contacts 30C and 33C to open position thereby interrupting the parallel holding circuit between energized conductor 197 and conductor 201. Since no overlapping circuit has been provided prior to opening of switch contact 30C, the energized control circuit from input conductor 165 to conductor 198 is interrupted to immediately stop right table movement at either a feed or a rapid rate. Immediately subsequent to the opening of switch contact 33C, however, the energization of relay 223 together with energized relay 220 do effect closure of normally open associated contacts 223–1 and 220–1 to establish a parallel starting circuit between vertical conductors 201 and 197. With the contacts 220–3, line 35X and 223–3, line 38X retained in energized closed position, a circuit is conditioned for resuming rightward table movement at a rapid rate upon again momentarily depressing table start switch 35R. As the table resumes rightward movement, the land 208 of dog 60 moves out of engagement with switch plunger 30, permitting contact 30C to return to its normally closed position thereby immediately bridging a parallel circuit between vertical conductors 201 and 197. To prevent stopping of the table, however, relays 220 and 223 are both retained in energized condition by associated closed contacts that interconnect conductors 290 and 291 to maintain a circuit from conductors 212 to 213. Thus, both relays 220 and 223 remain energized until the land 209, FIG. 5, moves out of engagement with switch plunger 33c. However, during this interval, a parallel circuit has already been established by closure of 30C to interconnect conductors 201 and 197, prior to de-energization of relays 220 and 223 by the opening of switch contacts 33–0 and subsequent opening of relay contacts 220–1 and 223–1. The table right starting circuit is connected to effect appropriate energization of table right relay 177, automatic rapid traverse relay 179, and rapid traverse control relay 175, as well as the required clutch solenoids.

It will now be assumed that the table right split cycle illustrated in FIG. 5 has been completed, and the table is moving leftwardly at a rapid rate toward the dynamic center stop position. As this occurs, due to the slight misalignment between the lands presented by stop "R" dog 60, the land 209 now engages switch plunger 33 slightly in advance of the land 208 engaging switch plunger 30. The reversed sequence of switch engagement, positions the control system for resuming rapid movement from the dynamic stop position only in a corresponding leftward direction. With both of the switches 30S and 33S actuated, signal control relays 220 and 223 are again energized to condition a table starting circuit by effecting closure of the associated contacts in line 216 at 7X. The table can now be restarted for movement in a leftward direction at rapid rate by momentarily depressing the table left push button switch 35L.

Referring to FIG. 3, a stop "F" dog 48 therein is operative to effect coded engagement of switch plungers 31 and 32 for effecting a dynamic stop condition of the worktable. Dog 48 stops worktable movement when these switch plungers are actuated, irrespective of whether the table is moving in a leftward or rightward direction. Referring to FIG. 11, actuation of switches 31S and 32S effects movement of normally closed contacts 31C and 32C respectively to open position, interrupting the holding circuit from conductor 198 to 215 to stop worktable movement. At the same time, switch contacts 31–0 and 32–0 are retained in closed position for simultaneous energization of relay coils 221 and 222. Thereupon, an intermediate parallel holding circuit is re-established via the now closed contacts, between conductors 198 and 215 associated with energized relays 221 and 222. With this condition existing, the table can be restarted in selected direction by depressing either push button switch 35L or push button switch 35R. Upon restarting the worktable in a selected direction, a holding circuit for retaining one or another of the table directional relays 176 or 177 energized, is established from conductor 198 via the now closed contacts 221–5 and 222–5, line 31X, to conductor 215 connected as hereinbefore described to energized conductor 165. Upon resuming movement of the worktable in the selected direction, stop dog 48 is moved out of engagement with the switch plungers 31 and 32 which then move to the positions illustrated in FIG. 11. The time overlap, as this occurs, is such that the holding circuit continues from conductor 198 via now closed switch contacts 31C, 32C to conductor 215 prior to the circuit being interrupted by movement of contacts 221–5 and 222–5 to open position upon deenergization of relays 221 and 222.

If table movement is restarted in a rightward direction, trip dog 47 immediately actuates limit switch 33S for energizing relay 223 to change the rate of movement from feed to rapid, the rapid rate continuing as the table moves in a rightward direction until the feed right dog 46 engages switch plunger 32 as hereinbefore explained. Aside from the extremely brief interval at feed movement in restarting in a rightward direction, it will be apparent that the trip dog 47 together with the associated stop "F" dog 48 performs a function substantially equivalent to the stop "R" dog 60 illustrated in FIG. 5.

It will be apparent that the electrical control circuit illustrated in FIG. 11 is provided with various other interlocking features. For example, depressing a table left push button switch 35L both completes a circuit for energizing the table left relay 176, and moves a normally closed contact 35CL to open position to preclude simultaneous energization of the table right relay 177. In a similar manner, depressing table right push button switch 35R actuates an associated contact that prevents energization of the table left directional relay 176 upon selected energization of the table right relay 177. In the solenoid control circuit, a plurality of capacitors, such as the one identified as 294, are respectively interconnected in the power supply conductors to the various clutch control solenoids and a common vertical conductor 295 connected via a resistor 296 to the energized conductor 174 in conventional manner for arc suppression.

For operating the machine in manual, instead of automatic mode, the selector switch 38D is positioned leftwardly in the manual location so that the upper contact bar 227 is moved into open position and the lower contact bar 231 is moved into closed position bridging the circuit between conductors 232 and 233. With this condition existing, the machine can be started in either a leftward or rightward direction by momentarily depressing either the push button switch 35L or 35R. During this mode of operation, the usual seal-in circuits are established by retaining either table left relay 176 or table right relay 177 energized. During manual mode, table movement is always initiated at feed rate, the rate being changed to rapid by depressing rapid traverse control button 36, line 15X. Table movement at feed rate will continue until interrupted by depressing the table stop button switch 39C. If any of the control dogs are in the table T-slot 28A, table movement will likewise be stopped upon engagement of either the top "F" dog 48 or the stop "R" dog 60 with the associated switch plungers as hereinbefore explained. Whenever this occurs, it will be apparent that the seal-in circuit from conductor 198 to energized conductor 165 will immediately be interrupted to stop table movement with one or another of the stop dogs remaining in engagement with the actuated switch plungers.

Table movement can then be reinitiated in manual mode by again depressing either the table left push button switch 35L or the table right push button switch 35R momentarily. Another condition for stopping table movement, in either automatic or manual mode, occurs whenever the right or left safety limit dogs engage the appropriate switch plungers carried by the central trip control post. For example, during rightward movement of the worktable, the safety limit stop 53R will engage trip post plungers 31, 32 and 33 to stop further rightward movement of the worktable. Whenever this happens, an automatic safety interlock in the electrical control circuit prevents further table movement in a rightward direction. Thus, even if the table right push button switch 35R is momentarily depressed with switches 31S, and 32S and 33S actuated the table will not move in a rightward direction. At this time, the worktable can only be moved leftwardly at its allowable rate of movement by momentarily depressing the table left push button 35L.

In similar manner, the table left safety limit stop 53L engages the upper three switch plungers 30, 31 and 32 to stop leftward movement of the table. At this time, the table left push button switch 35L is ineffective, even though depressed, to initiate further leftward table movement. Thus, the table can only be moved in a rightward direction within its usual allowable range of movement by momentarily depressing the push button switch 35R.

Due to the unique series, parallel interconnections of switch contacts and contact bars between conductor 198 and conductor 165, the code operated limit switches 30S, to 33S inclusive, will have no effect upon initiating table movement in either direction, until one or another of the directional control relays 176 or 177 have been previously energized. Thus, the table can be moved manually by means of a hand crank 302, FIG. 9, without inadvertently restarting the power driven transmission for automatically moving the worktable. In other words, even though the table screw 23 is so rotated that one or another of the preset trip dogs is moved into engaged position with an associated switch plunger, the power control system will not be restarted to effect movement of the worktable. To achieve this crank-safe result, however, a switch 180, FIGS. 9 and 11, is provided to deenergize both of the table directional clutches 124 and 125. These clutches constitute a dynamic brake for restraining the screw 23 against rotation, as hereinbefore explained. To effect manual movement, the hand crank 302 is moved inwardly until a peripheral flange 303 presented by the inner hub thereof actuates a release switch 180 to de-energize directional clutches 124, 125. A jaw clutch 304, comprising cooperating jaw teeth carried by the hand crank and end of the table screw 23, is then engaged. The crank is retained in engaged position by operation of a detent 305 engaging an annular groove on the rotatable shaft of the hand crank 302. With this condition existing, the worktable may be moved by rotating the hand crank 302. Power operated movement of the worktable is prevented by means of the release switch 180 interlock, FIG. 11, which is retained in open position to prevent energization of one or another of the directional solenoids 124S and 125S.

Referring again to the several electro-magnetic clutches shown in FIG. 9, each of these clutches is identical and operates in well known manner to effect engagement of cooperating clutch plates for transmitting power. For example electro-magnetic clutch 120 is provided with a cooperating non-rotatable solenoid 120S to which current is transmitted by means of power supply conductors (not shown). The clutch solenoid 120S is retained in stationary, non-rotating position relative to a rotatable portion of the clutch 120b that is keyed directly to the rate change shaft 115. Cooperating clutch plates respectively keyed at their outer periphery to rotatable clutch element 120b are engageable with other clutch plates keyed at their inner periphery to a rotatable gear element 120C.

One of the principal advantages of the present invention is that all of the control functions are performed by electrically energizable signal control relays and power supply relays, to effect selective energization of cooperatively associated electro-magnetic clutches. While electro-magnetic clutches employing multiple plates are illustrated as a preferred embodiment of the invention, it will be apparent that other types of power transmitting clutches may be used with equal advantage. For example, hydraulically actuatable clutches either of the multiple plate or cooperating jaw teeth, type may be used with substantially equivalent results.

The principles of this invention having now been fully explained in connection with the foregoing description, we hereby claim as our invention:

1. In a machine tool, a frame, a plurality of switches carried by said frame, a support slidably carried by said frame, a plurality of switch actuating dogs including stop dogs adjustably positionable upon said support in a manner to effect predetermined actuation of said switches individually and in code fashion, certain of said dogs being respectively operative to actuate a selected one of said switches individually for initiating one machine function including rate changes, certain other of said dogs being operative to actuate a predetermined plurality of said switches in combination for initiating a different machine function including reversed movement, a power driven reversible rate change mechanism connected to move said support member in a selected direction at a selected rate in accordance with the coded actuation of said switches during support movement, said mechanism being operative to stop movement of said support upon actuation of certain of said switches by a stop dog, and manual means connected to actuate said mechanism for effecting continued movement of said support in either direction when a stop dog is engaged with certain of said switches.

2. In a machine tool control mechanism, a movable support, a plurality of switches carried in operative proximity to said support in a manner to be actuated in predetermined binary code fashion, a plurality of first switch actuating dogs adjustably secured to said support in a manner to actuate said switches individually during support movement, a plurality of second dogs secured to said supports to respectively actuate a plurality of said switches in predetermined binary code fashion during support movement, and a power driven selectively reversible rate change mechanism including a source of power operatively connected to be actuated by coded operation of said switches for automatically changing the rate and direction of movement of said support.

3. In a machine tool, a support member carried for rectilinear movement, a reversible drive mechanism selectively connectable to move said support member in a selected direction, a rate changed connectable to drive said drive mechanism at a selected rate, a control circuit including a source of power connectable to selectively actuate said reversible drive mechanism for moving said support member in selected direction and for stopping movement of said support member, said control circuit being simultaneously operable for actuating said rate changer to drive said reverse mechanism at a rapid or slow rate of travel and for disconnecting said rate changer from said reverse mechanism whenever said rate changer is not connected to effect directional movement of said support, a stationary control post carried in operative proximity to said support member, a plurality of switches carried by said control post, said switches being operatively connected when actuated in predetermined binary code fashion to actuate said control circuit for effecting selected operation of said support member, and a plurality of adjustably positioned dogs removably secured to said support member to actuate said switches in predetermined fashion upon movement of said member relative to said stationary control post, certain of said dogs being respectively operable to effect individual operation of a selected one of said switches, and certain of said dogs being respectively operable to effect simultaneous operation of a selected plurality of said switches.

4. In a machine tool, a frame, a plurality of switches carried by said frame, a support slidably carried by said frame for rectilinear movement, a plurality of switch actuating dogs adjustably secured to said support in such position as to effect individual and coded actuation of said switches upon movement of said support relative thereto, a power driven reverse mechanism connected to move said support and connected to be actuated by coded actuation of a preselected plurality of said switches for reversing the direction of support movement, a power driven rate change mechanism connected to drive said reverse mechanism and being connected to be actuated by individual actuation of one of said switches for changing the rate of support movement, and manual control means including a control circuit and a source of power operatively connected to activate said rate changer and said reverse mechanism for initiating movement of said support independently of said dog actuated switches.

5. In a machine tool, a base with a cutter movably mounted thereon, a workpiece support movable relative to said base, a plurality of dogs adjustably positioned on said support, a plurality of switches mounted on said base for selective actuation individually and in coded combination dependent on the positioning of said dogs whereby different movements of said support are initiated by the coaction between different dogs and switches during support movement, a reversible power driven transmission for automatically moving said support in a selected direction and at different speeds and for stopping said support dependent on selective individual and coded actuation of said switches, and manually operable means for effecting movement of said support.

6. In a machine tool, a base with a cutter movably mounted thereon, a workpiece support movable relative to said base, a plurality of dogs adjustably positioned on said support in coded manner, a plurality of switches mounted on said base for selective actuation individually or in coded combination dependent on the positioning of said dogs whereby different movements of said support are initiated by different dogs and switches, a reversible power driven transmission for automatically moving said support in different directions and at different speeds and for stopping said support dependent on selective individual and coded actuation of said switches, and an electric control circuit including a source of power for controlling the operation of said power transmission dependent on selective actuation of said switches.

7. In a machine tool, a base with a cutter movably mounted thereon, a workpiece support reciprocable relative to said base, plural dogs adjustably positioned on said support in predetermined spaced relationship dependent on the desired direction and speed of movement of said support, plural switches mounted on said base in spaced relationship for selective actuation in binary coded manner dependent on the positioning of said dogs whereby different movements of said support are initiated by different dogs and switches during movement of said support, up to three of said switches being operated in coded combination by a single one of said dogs, a power driven transmission for automatically moving said support in differtnt directions and at different speeds and for stopping said support, a plurality of speed and directional clutches operably connected with said transmission, an electric control circuit including a source of power for changing operation of said power transmission dependent on selective actuation of said switches, and manually operable means for restarting movement of said support after said switches are actuated for interrupting operation of said transmission.

8. In a machine tool having a frame, a support movably carried by said frame for reciprocable movement, reversible variable speed drive means selectively actuatable to drive said support at a selected rate in either direction, circuit control means including manual start means operable to actuate said drive means selectively for moving said support, a plurality of first switches operable in combination during support movement in a first direction to actuate said control means for reversing support movement to a second direction, a plurality of second switches operable in combination during support movement in the second direction to actuate said control means for effecting a reversal of support movement to the first direction, said second switches being simultaneously operable upon effecting reversal to condition said control means to render said first switches individually operative to change the rate of support movement when actuated during support movement in the first direction, said first switches being simultaneously operable upon effecting reversal to condition said control means for rendering said second switches individually operative to effect rate changes during support movement in the second direction, a first reverse dog secured to said support in position to actuate a plurality of said first switches in combination, a second reverse dog secured to said support in position to actuate a plurality of said second switches in combination during movement in the second direction, a plurality of rate change dogs adjustably secured to said support for respectively actuating a selected switch in both directions of support movement, said rate change dogs being adapted to coact with individual ones of said first and second switches in accordance with the direction of support movement, and a stop dog adjustably secured to said support and being operative to actuate a preselected plurality of said first and second switches in both directions of support movement for actuating said control means to stop support movement, said stop dog being operative in conjunction with the said switches actuated thereby to condition said control means for restarting support movement in a selected direction.

9. In a cycle control system for a machine tool, a frame, a support member slidably carried by said frame for rectilinear movement, a plurality of rate change switches carried by said frame in spaced perpendicular relationship to the path of support movement, a plurality of dogs adjustably secured to said support in spaced longitudinal and perpendicular relationship and being operative to actuate corresponding rate change switches in either direction of movement, power operable variable speed drive means operative to move said support in a first direction from a starting position on said frame, control circuit means including manual starting means responsive to individual actuation of said switches during support movement in the first direction and being operatively connected thereupon to activate said drive means for changing the rate of support movement in the first direction, reverse control means predeterminately operative during movement of said support in the first direction and being connected to reverse the direction of support movement, said reverse control means being simultaneously operative to render said control circuit means inoperative to change the rate of support movement even though said switches are individually actuated during reversed support movement, and stop means responsive to arrival of said support in its starting position to deactivate said reverse control means.

10. In a milling machine, a support member slidably carried by said machine for reciprocable movement, reversible variable speed drive means operable to move said member, circuit control means including selectively operable start means operable to activate said drive means for initiating movement of said member in one direction from a starting position, a plurality of function change switches carried by said machine in proximity to said member and being interconnected in said circuit means for controlling said drive mean during support movement, a plurality of separate dogs secured to said member in spaced relationship and being respectively operative during movement of said member to effect selective individual actuation of one of said switches to change the rate of support movement, a single reverse dog adjustably secured to said member in a manner to effect coded actuation of a plurality of said switches to effect reversal in the direction of support movement, and stop means connected to stop reversed movement of said member upon its arrival in the initial starting position.

11. In a machine tool control system, a frame, a work support slidably carried by said frame for reciprocable longitudinal movement therealong, said support being provided with longitudinally extending dog receiving means, a plurality of first switches in a first group secured to said frame in perpendicular spaced relationship to said longitudinally extending dog receiving means, a plurality of second switches secured to said frame in perpendicular spaced relationship to said dog receiving means and in spaced relationship to said first switches, a first plurality of switch actuating dogs adjustably secured to said dog receiving means and respectively provided with integrally formed cam faces spaced different distances in the same direction from said dog receiving means in a manner to actuate a corresponding individual one of said first switches during support movement, a plurality of second switch actuating dogs identical in configuration to said first dogs and being reversibly and removably secured to said dog receiving means in a manner that the cam faces formed therewith extend like distances in an opposite direction to actuate individual selective ones of said second switches during support movement, a first reverse dog adjustably secured to said receiving means and provided with an enlarged cam face extending in one direction therefrom to effect coded actuation of a plurality of said first switches for reversing support movement from the first to the second direction, a second reverse dog identical in configuration to said first reverse dog and being reversibly secured to said receiving means with the enlarged cam face presented thereby extending the opposite direction to actuate a plurality of said second switches for effecting reversal of support movement from the second to the first direction, reversible variable speed drive means connected for selective actuation to drive said support, control circuit means including selectively operable start and stop means operatively connected to control reversing operation of said drive means for moving said support in response to coded actuation of said switches by said reverse dogs, first auxiliary circuit means interconnected in said control circuit and being connected to render said first switches individually operative to activate said drive means for changing the rate of support movement in the first direction, and second auxiliary means operative to render said second switches operative to activate said drive means for changing the rate of support movement in the second direction, whereby said first switches are inoperative to change rate in the second direction and said second switches are inoperative to effect rate changes in a first direction.

12. In a machine tool having a frame, a work support movably carried by said frame for longitudinally reciprocable movement and presenting longitudinally extending dog receiving means, a plurality of first switches and a plurality of second switches carried by said frame in operatively spaced proximity to said dog receiving means, a plurality of first dogs adjustably secured to said dog receiving means and presenting integrally formed actuating cams spaced different distances in the same direction to respectively actuate a corresponding one of said first switches during support movement in a first direction, a plurality of second dogs identical in configuration to said first dogs reversibly and adjustably secured to said dog receiving means in a manner that the actuating cams integrally formed therewith extend in the opposite direction to actuate a corresponding one of said second switches during support movement in a second direction, a power driven variable speed transmission mechanism reversibly operative to move said work support, circuit control means including start means connected to automatically effect operation of said reversible transmission for effecting reversal of work support movement to effect a continuous reciprocable cycle of support movement, auxiliary control means connected to render said first switches operative to actuate said control means for changing the rate of support movement during a first direction and to render said second switches operative to actuate said control means for changing the rate of support movement in a second direction, and means for actuating said control means to stop movement of said support.

13. In a machine tool cycle control system, a frame, a work support slidably carried by said frame for reciprocable movement, power operable drive means connected for selective actuation to move said support in a selected direction of movement, circuit control means including start means and a source of power connected to actuate said drive means for moving said support in selected direction, a pair of reverse dogs adjustably secured to said support in longitudinally spaced positions to limit the rectilinear range of support movement, a plurality of first switches carried by said frame in position to be actuated by one of said reverse dogs during support movement to effect a reversal of movement, a plurality of second switches carried by said frame in position to be simultaneously actuated by the other of said reverse dogs during support movement to effect reversal of support movement in the opposite direction, said switches being so interconnected with said circuit means as to operate said drive means for effecting the required dog initiated support movement, and a single stop dog adjustably secured to said support in position to actuate a plurality of said first and second switches simultaneously, said stop dog and said switches actuated thereby being operable to actuate said drive means to stop support movement as well as condition said circuit means for restarting movement in a selected direction.

14. In a machine tool, a frame, a support slidably carried by said frame for rectilinear movement, a plurality of first and second switches carried by said frame, a pair of reverse dogs adjustably secured to said support and being respectively operable during support movement to actuate a plurality of said first switches and a plurality of said second switches for effecting reversal of support movement, a single stop dog adjustably secured to said support and operative during support movement to actuate in combination a plurality of said first and second switches for stopping support movement, control circuit means including manual start means and a source of power connected to provide command signals in accordance with the actuation of said first and second switches, and reversible power drive means actuatable to move said support in accordance with command signals from said circuit means.

15. In a machine tool having a frame, a work suppor movably carried by said frame for reciprocable movement, a variable speed drive connected to move said work support at slow and fast rates in a selected direction of movement, a plurality of switches carried in spaced relation by said frame in a plane perpendicular to the plane of work support movement, a control circuit connected to be responsive to said switches and operative to actuate said variable speed drive for changing the rate and direction of support movement, a plurality of dogs releasably secured to said work support in a manner to actuate corresponding ones of said switches individually, a pair of reverse dogs secured to said support and respectively adapted to actuate a different selected pair of said switches to effect reversed movement of said work support, a stop dog secured to said support adapted to actuate a selected combination of said switches to terminate movement of said work support and simultaneously preset said control circuit for restarting movement in a selected direction, a source of power connected to drive said variable speed drive, a source of electrical power connected to said control circuit; and manually operated means connected to initiate movement of said work support in either direction.

16. In an automatic control system for a machine tool having a base with a work support movably carried thereon for rectilinear movement, a reversible power driven transmission connected to drive the work support at slow and rapid rate of travel, an electrical control circuit including a source of power connected to actuate said transmission for moving said support in a selected direction and at a selected rate of travel, a plurality of rate change switches operatively interconnected in said circuit and being mounted in spaced relation in said base in a plane perpendicular to the plane of travel of said work support, a plurality of unyielding presettable switch actuating means adjustably secured to said work support in predetermined position to effect selective individual actuation of said switches for controlling the operatin of said transmission, a plurality of reverse control switch actuating means removably secured to said support and respectively operative to actuate a predetermined plurality of said switches in combination, a plurality of auxiliary circuits operatively interconnected with said control circuit to condition said control circuit for selected movement in response to combined actuation of said rate change switches by one of said reverse control switch actuating means.

17. In a machine tool, a base, a work support slidably carried by said base for reciprocable movement at slow and fast rates in a selected direction, a reversible transmission connected to drive said work support at feed and rapid rates of movement in a selected direction, a motor connected to drive said transmission, an electrical control circuit operative to control said transmission for moving said work support, a first pair of rate change switches mounted in said base in vertically spaced relationship relative to said base and being severally actuatable for effecting a change in rate of work support movement during movement in a rightward direction, said first pair of switches operative to effect reverse movement from right to left when actuated in combination, a second pair of rate change switches mounted in said base in vertically spaced relationship relative to said base and being severally actuatable for effecting a change in rate of work support movement during movement in a leftward direction, said second pair of switches operative to effect reverse movement from left to right when actuated in combination, a first pair of rate change dogs presenting cam surfaces secured in spaced relationship to said work support and operative to individually and selectively actuate said first pair of switches during rightward movement of said work support, a second pair of rate change dogs presenting cam surfaces secured in spaced relationship to said work support and operative to individually and selectively actuate said second pair of switches during leftward movement of said work support, a pair of reverse dogs presenting cam surfaces secured to said work support, one of said reverse dogs operative to actuate said first pair of rate change switches, and the other of said reverse dogs operative to actuate said second pair of rate change switches; a source of electric power connected to said control circuit; and manually operable means connected to initiate movement of said work support from a stopped condition.

18. In a machine tool having a base and a rectilinearly movable work support, a reversible variable speed drive connected to move said work support in a selected direction at slow and fast rates, a plurality of rate change switches carried by said base, an electrical control circuit connected to be actuated by said switches and adapted to control said variable speed drive, a plurality of dogs releasably secured to said work support, a plurality of said dogs presenting cam surfaces that respectively actuate corresponding ones of said switches during movement of said work support, one of said dogs being a stop dog presenting cam surfaces for simultaneously actuating two of said switches in coded combination to terminate movement of said work support during any rate and direction of movement, and manually operated means actuatable to initiate movement of said work support in either direction.

19. In a machine tool having a frame, a reciprocable work support carried by said frame and movable at a selected rate in a selected direction; a plurality of switches carried by said frame in operative proximity to said work support, a variable speed drive reversibly operably connected to drive said work support, an electrical control circuit operative in response to actuation of said switches and actuatable to control the operation of said variable speed drive to modify the rate and direction of movement of said work support, a plurality of dogs secured to said work support in a manner to effect individual actuation of said switches according to a selected cycle of movement, another dog adjustably secured to said support and adapted to simultaneously actuate a selected plurality of said switches to terminate movement of said work support simultaneously therewith to render said control circuit operative for initiating subsequent movement of said work support, a power source connected to drive said transmission and means connected to initiate movement of said work support from a stopped condition.

20. In a machine tool having a movable member, reversibly operative variable speed power drive means operative to move said member at a selected rate in a selected direction, a plurality of switches carried in spaced relationship to said member for operation individually and in coded combination during movement of said member for operating said drive means to change the rate and direction of movement of said member, a plurality of dog actuating means secured to said member in predetermined positions for effecting actuation of said switches individually and in coded combination during movement of said member, and associated control means adapted to render certain of said switches unidirectionally operative to control operation of said power drive means when actuated during movement of said member in one direction and inoperative to control operation of said power drive means even though actuated during movement of said member in an opposite direction.

21. In an automatic cycle control system for a reciprocable member of a machine tool, power drive means reversibly operative to move said member in a selected direction, a plurality of signal actuating means carried in spaced relationship to said movable member to operate said power drive means for moving said member at a selected rate in a selected direction of movement, a plurality of control dogs adjustably secured to said member predeterminately operative during movement thereof to actuate selected ones of said signal actuating means individually and in coded combination for operating said drive means to change the rate and direction of movement of said member, and means for rendering certain of said signal actuating means operative when actuated during movement of said member in one direction to control the operation of said drive means and inoperative to control the operation of said drive means even though actuated during movement of said member in an opposite direction.

References Cited in the file of this patent

UNITED STATES PATENTS

| | | |
|---|---|---|
| 1,960,815 | Jessen et al. | May 29, 1934 |
| 2,217,671 | Coffin et al. | Oct. 15, 1940 |
| 2,679,678 | Stephan | June 1, 1954 |
| 2,694,961 | Senn et al. | Nov. 23, 1954 |
| 2,764,067 | Armitage et al. | Sept. 25, 1956 |
| 2,781,879 | Ebersold | Feb. 19, 1957 |
| 2,963,945 | Baker et al. | Dec. 13, 1960 |